United States Patent
Riocreux et al.

(10) Patent No.: US 8,463,966 B2
(45) Date of Patent: Jun. 11, 2013

(54) SYNCHRONISING ACTIVITIES OF VARIOUS COMPONENTS IN A DISTRIBUTED SYSTEM

(75) Inventors: Peter Andrew Riocreux, Cheadle (GB); Bruce James Mathewson, Papworth Everard (GB); Christopher William Laycock, Sheffield (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 220 days.

(21) Appl. No.: 12/923,906

(22) Filed: Oct. 13, 2010

(65) Prior Publication Data
US 2011/0125944 A1     May 26, 2011

(30) Foreign Application Priority Data

Oct. 13, 2009 (GB) .................................. 0917946.6
Apr. 30, 2010 (GB) .................................. 1007342.7
Apr. 30, 2010 (GB) .................................. 1007363.3
Oct. 1, 2010 (GB) .................................. 1016482.0

(51) Int. Cl.
*G06F 13/00* (2006.01)
*G06F 13/364* (2006.01)

(52) U.S. Cl.
CPC .................................. *G06F 13/364* (2013.01)
USPC .................................. 710/107; 710/305

(58) Field of Classification Search
USPC .................................. 710/104–125, 305–317
See application file for complete search history.

(56) References Cited

U.S. PATENT DOCUMENTS

| | | | |
|---|---|---|---|
| 5,675,579 A | 10/1997 | Watson et al. | |
| 6,038,646 A | 3/2000 | Sproull | |
| 6,430,646 B1 | 8/2002 | Thusoo et al. | |
| 6,647,453 B1 * | 11/2003 | Duncan et al. | 710/306 |
| 6,748,518 B1 | 6/2004 | Guthrie et al. | |
| 6,795,878 B2 * | 9/2004 | Brown et al. | 710/43 |
| 6,967,926 B1 | 11/2005 | Williams et al. | |
| 7,631,130 B2 * | 12/2009 | Jensen | 710/111 |

(Continued)

FOREIGN PATENT DOCUMENTS

| | | |
|---|---|---|
| EP | 1 594 061 | 11/2005 |
| EP | 2 015 167 | 1/2009 |
| WO | WO 2006/102667 | 9/2006 |

OTHER PUBLICATIONS

International Search Report and Written Opinion of the International Searching Authority Dec. 10, 2010 for PCT/GB2010/051715.

(Continued)

*Primary Examiner* — Raymond Phan
(74) *Attorney, Agent, or Firm* — Nixon & Vanderhye P.C.

(57) ABSTRACT

The initiator device receives requests from and issues transaction requests to a recipient device via an interconnect. A barrier generator generates barrier transaction requests indicating to the interconnect that an ordering of some transaction requests within a stream of transaction requests passing through the interconnect should be maintained by not allowing reordering of some of the transaction requests that occur before the barrier transaction request in the stream of transaction requests with respect to the barrier transaction request. In response to a synchronize request querying progress of a subset of transaction requests, the initiator device actions any pending transaction requests within the subset of transaction request and the barrier generator generates and issues a barrier transaction request to the interconnect. In response to receiving a response to the barrier transaction request, the initiator device issues an acknowledge signal as a response to the synchronize request.

25 Claims, 11 Drawing Sheets

U.S. PATENT DOCUMENTS

| | | | |
|---|---|---|---|
| 7,657,680 B2 * | 2/2010 | Dybsetter | 710/106 |
| 7,783,817 B2 * | 8/2010 | Sullivan et al. | 710/310 |
| 7,908,406 B2 * | 3/2011 | Dybsetter | 710/11 |
| 7,917,676 B2 * | 3/2011 | Sullivan et al. | 710/110 |
| 2003/0110340 A1 | 6/2003 | Butler et al. | |
| 2006/0218335 A1 | 9/2006 | Hofmann et al. | |
| 2007/0250668 A1 | 10/2007 | Arimilli et al. | |
| 2008/0301342 A1 | 12/2008 | Hofmann et al. | |

OTHER PUBLICATIONS

Search Report for UK 0917946.6 dated Jan. 22, 2010.
Search Report for UK 1007363.3 dated Aug. 23, 2010.
Search Report for UK 1007342.7 dated Aug. 20, 2010.

* cited by examiner

SYNCHRONISING ACTIVITIES OF VARIOUS COMPONENTS IN A DISTRIBUTED SYSTEM

TECHNOLOGY OVERVIEW

This technology relates to the field of data processing systems and in particular to distributed systems having different initiator devices that communicate with at least one recipient device via an interconnect and ways of synchronising the activities of the different components within such a system.

BACKGROUND

Interconnects are used to provide connections between different components in data processing systems. They provide data routes via which one or more initiator devices may access one or more recipient device. An initiator device is simply a device that generates a transaction request, and therefore may be a master such as a processor or it may be another interconnect. A recipient device is simply a device that receives the transactions and it may be a slave such as a peripheral or it may also be another interconnect.

As systems become more complex with multiple processors communicating with each other and with multiple devices, authors writing software for multiprocessor systems need detailed knowledge of the topology and latency of an architecture, in order to write software which ensures consistent behaviour of interacting processes across time. Even with this detailed knowledge this consistency is only achieved with some non-trivial effort and cost to performance.

It would be desirable to provide mechanisms that allowed a programmer to ensure consistent behaviour of interacting processes across time in a generic manner for an arbitrary architecture. Such mechanisms may include methods of ensuring synchronisation of different components at certain times, such that components sharing the same resources know at which point they have visibility of each others transactions.

SUMMARY

An initiator device for issuing transaction requests to a recipient device via an interconnect comprises: at least one port for receiving requests from and issuing requests to said interconnect; a barrier generator for generating barrier transaction requests, said barrier transaction requests indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to said barrier transaction request; wherein in response to receipt of a synchronise request querying progress of at least a subset of transaction requests, said initiator device is responsive to action any pending transaction requests within said at least a subset of transaction request and to generate a barrier transaction request at said barrier generator and to issue said barrier transaction request to said interconnect via said at least one port, and in response to receiving a response to said barrier transaction request to issue an acknowledge signal as a response to said synchronise request.

The inventors recognized that it may be difficult to determine when transaction requests that are being actioned by other devices have completed or at least have reached a known point. They addressed this problem by using synchronise requests, which queries whether particular transaction requests have been actioned or not. In order for the initiator device that actions these requests to determine when at least some transaction requests previously issued have proceeded to a certain point, it generates a barrier transaction request and sends this to follow the previously issued transaction requests. The ordering of the at least some transaction requests whose progress is to be monitored can be determined by the progress of the barrier transaction as the system is configured such that these transactions must stay in front of the barrier. Thus, a response from the barrier will not only indicate that the barrier has reached the location of the response generator but also that the at least some transaction requests have also reached this point. In this way the progress of transaction requests can be determined.

In some embodiments, said subset of transaction requests comprise all transaction requests issued by said initiator device to said at least one recipient device and said at least some transaction requests whose ordering is maintained by said barrier transaction request comprise said all transaction requests issued by said initiator device.

In some embodiments the synchronise request might just be asking for notification of when all of the pending transaction requests of another initiator device have completed or reached a particular point. In this case the subset is all of the transaction requests and the barrier transaction request maintains an ordering of all of the transaction requests, so that a knowledge of the barrier's progress provides a knowledge of all of the transaction requests progress.

In some embodiments said initiator device further comprises: a memory management unit; said at least a subset of transaction requests include said memory management operation requests and said synchronise request being a memory management synchronise request querying when said memory management operation requests have completed and when previously issued transaction requests whose status would be affected by said memory management operation requests have reached a predetermined point within said interconnect; said initiator device being configured to issue said acknowledge signal in response to receipt of said response to said barrier transaction request and in response to said pending memory management operations being completed.

Memory management operation transaction requests that are issued can be accepted by other initiator devices with memory management units, however these devices may not implement them immediately. This can be advantageous as these requests have a high latency and it may not be desirable if they affect the processing of other high priority transactions. At a certain point in processing, the processor may recognise that transactions that are issued beyond this point require the memory management operations to have been performed. At this point, the initiator device issues a memory management synchronise request. Receipt of the memory management synchronise request at an initiator device indicates to that initiator device that any pending memory management operation requests that it has already received from the initiator device issuing the synchronise request must be processed. Thus, in response to receiving such a synchronise request, the initiator device actions any pending memory management operation requests to the interconnect and transmits a barrier transaction request to the interconnect. In this way, receipt of a response to the barrier transaction request provides an indication to the initiator device that any earlier issued transactions have reached a certain point and if this point is chosen correctly, the initiator device may be able to send a response to the memory management synchronise request at this moment. Thus, the use of barrier transaction requests in this way enables the initiator device to determine when it can respond to the memory management synchronise requests.

In some embodiments, said initiator device comprises a further port for receiving transaction requests from a processor, said initiator device transmitting at least some of said transaction requests to said interconnect.

The initiator device may simply comprise a memory management unit. In this case, it may comprise a further port for receiving transaction requests from a processor. The memory management unit will route this transaction requests to the interconnect and will perform any memory management operations that the processor demands it to perform. It will also forward other memory management operations that are to be formed on other initiator devices to the interconnect.

In some embodiments, said initiator device further comprises a processor for processing data; said processor is configured to issue transaction requests and said synchronise request to said interconnect; said barrier generator being configured to generate a synchronise barrier transaction request and to issue said barrier transaction request to said interconnect to follow behind transaction requests issued by said processor to said at least one recipient device prior to said synchronise request.

Although, the initiator device may just comprise the memory management unit, in some embodiments it comprises a processor as well as a memory management unit. Such an initiator device may not only receive memory management operations requests and synchronise requests it may also generate these requests and transmit them to the interconnect. If it does generate such a synchronise request then it will issue a synchronise barrier after this synchronise request such that it can determine when previously issued transaction requests to the at least one recipient device have reached a certain point.

Another example embodiment provides an initiator device for issuing transaction requests to a recipient device via an interconnect, said initiator device comprising: a processor for processing data; at least one port for receiving requests from and issuing requests to said interconnect; a barrier generator for generating barrier transaction requests, said barrier transaction requests indicating to said interconnect that an ordering of at least some transaction requests within a stream of transaction requests passing through said interconnect should be maintained by not allowing reordering of said at least some of said transaction requests that occur before said barrier transaction request in said stream of transaction requests with respect to said barrier transaction request; wherein said processor is configured to issue transaction requests and a synchronise request querying progress of at least a subset of outstanding transaction requests to said interconnect; said barrier generator being configured to generate a synchronise barrier transaction request and to issue said synchronise barrier transaction request to said interconnect to follow behind transaction requests issued by said processor prior to said synchronise request to the at least one recipient device.

Initiator devices may issue synchronise requests when they wish to know the progress of transactions to be performed by other initiator devices. When they do this, they may also generate a synchronise barrier transaction request and transmit this to follow behind transaction requests issued previously to the at least one recipient device. In this way, not only can they determine from responses to the synchronise requests the progress of transactions issued by other initiator devices, but they can also determine the progress of transaction requests that they themselves have issued previously.

In some embodiments, said at least a subset of transaction requests are memory management operation requests and said synchronise request is a memory management synchronise request querying when said memory management operation requests have completed and when previously issued transaction requests whose status would be affected by said memory management operation requests have reached a predetermined point within said interconnect.

As noted previously, synchronisation is particularly useful where memory management operations are being performed. In such a case, at a certain point in processing it may become important that the memory management operations previously requested have completed and thus, at this point the synchronise request and barrier can be transmitted.

In some embodiments, said initiator device is responsive to said issue of said synchronise bather transaction request not to issue further transaction requests to said interconnect until a response to said synchronise barrier transaction request and to said synchronise request has been received.

In response to transmitting the synchronise barrier transaction request the initiator device may block the issue of further transaction requests until a response to the synchronise barrier transaction request and to the synchronise request have been received. If the synchronise request is one that requires the previous operations that it is querying to have been actioned before it is safe to transmit further transaction requests, then the initiator device will block the issue of further transaction requests until it has receipts from its own barrier transaction requests and from the synchronise request. At this point, provided the response signal generators are suitably arranged it can be sure that the earlier transaction requests have proceeded to a safe point and it can continue to issue transactions.

In some embodiments, said memory management operations comprise management of virtual to physical address translations and said at least some transactions that said barrier transaction maintains an order of comprise transactions using virtual to physical address translations current before said memory management operations are performed.

Memory management operations that require synchronisation are for example the management of virtual to physical address translations. Systems that have initiator devices using virtual addresses to address data stores in which data is stored using physical addresses require translations tables to translate from virtual to physical address. The updating of these translation tables needs to be consistently applied at least for initiator devices that use the same address space in memory. It can be difficult to do this if one is unsure of the number of initiator devices within the system using these translation tables. Furthermore, these actions have high latency and waiting for them all to complete and to be entirely sure that they have all completed can have a lot of performance overhead.

Generating a barrier transaction request and issuing this to follow behind at least one of the memory management operation transaction requests provides a way of maintaining an ordering with respect to the memory management operation transaction request and also in some cases determining how far it has proceeded. This is important as in the case that page tables are being updated, it is important that previous transactions that use the old tables have progressed beyond a certain point before the new tables are in place and it is also important that further transactions that use the new tables are not issued until this is the case.

In some embodiments, said barrier generator is configured to issue a barrier with a domain indicator associated with it, said domain indicator indicating an area within said interconnect within which a response to said bather transaction request cannot be issued.

One way of determining how far a barrier has progressed within the interconnect in a useful manner is to use a domain indicator. An interconnect may be divided into domains. If this is done in an intelligent manner then the domains may have certain properties, for example paths from two ports may all merge within a domain and thus on exiting the domains one knows that transactions from each of these two ports are visible to both of the ports. Thus, if a barrier has a domain indicator that does not allow a response within that domain, when a response is received one knows it is outside of the domain and thus, transactions from either port are visible to both ports at this point.

In some embodiments said synchronise request is a request querying whether at least some of said subset of transaction requests have reached a predetermined point within said interconnect, said synchronise request comprising an indicator indicating said predetermined point.

It may be advantageous if the synchronise request can carry information in the form of an indicator indicating a point in the interconnect synchronisation should occur at. Providing the information within the synchronise request enables the initiator device receiving it to control where it receives a response to a barrier request from and thus, enables it to acquire the required information to respond to the synchronise request.

In some embodiments said barrier generator is configured to issue barrier said domain indicator in dependence upon said indicator comprised within said synchronise request.

If the information regarding the predetermined point is provided within the synchronise request then the barrier generator can make use of this information along with its knowledge of the domains within the interconnect to provide the barrier transaction request with a suitable domain indicator, so that a response to the barrier transaction request indicates that the required transaction requests have at least reached the predetermined point.

A further example embodiment provides interconnect circuitry for a data processing apparatus, said interconnect circuitry being configured to provide data routes via which at least one of a plurality of initiator devices may access at least one recipient device and at least one other of said plurality of initiator devices, said interconnect circuitry comprising: a plurality of initiator ports for transmitting transaction requests between said plurality of initiator devices and said interconnect; at least one recipient port for transmitting transaction requests to said at least one recipient device; a plurality of paths for transmitting said transaction requests between said plurality of initiator ports and said at least one recipient port; and control circuitry for routing said received transaction requests from one of said plurality of inputs to one of said input or output ports along at least one of a plurality of paths; wherein at least some of said transaction requests comprise a synchronise request from a first one of said plurality of initiator devices querying progress of at least a subset of transaction requests; and said control circuitry is configured to route said synchronise request to at least one other of said initiator devices configured to action said at least a subset of transaction requests and to receive from said at least one other of said initiator devices a barrier transaction request said control circuitry being configured to route said barrier transaction request along at least one of said plurality of paths behind transaction requests previously received from said at least one other initiator device to said at least one recipient device and to maintain an ordering of at least some of said previously received transaction requests and said barrier transaction request in said transaction request stream; and in response to a response signal to said barrier transaction request to route said response signal to said at least one other of said plurality of initiator devices, said response signal providing an indication to said at least one other initiator device that said at least some previously received transaction requests have reached a location of said response signal generator.

In order for synchronise requests and the barrier transaction request to return responses with meaning, it is important that the interconnect has control circuitry associated with it so that the ordering of the barrier transaction request is maintained with respect to at least some of the transaction requests before it. In this way, one can determine from a response to the barrier transaction request that those requests that are maintained in front of it have also reached the point of response.

In some embodiments, said control circuitry comprises synchronise request duplication circuitry for duplicating said synchronise request and transmitting it to a plurality of said other initiator devices that action said at least a subset of said transaction requests; said control circuitry further comprising holding circuitry for holding response signals received from said plurality of other initiator devices to said duplicated synchronise request and for issuing a synchronise request response signal to said first initiator device in response to receipt of acknowledge responses to all of said duplicated synchronise requests.

It may be that there is more than one other initiator device that the subset of transaction requests are to be actioned by and thus, that the synchronised request is querying progress with, and in such a case, the synchronised request is duplicated and sent to all of these initiator devices. In such a case, the control circuitry will not respond to the synchronise request until it has received acknowledge responses from all of the initiator devices that it sent the synchronisation request to.

In some embodiments, said interconnect is configured in response to receiving a barrier transaction request from said first initiator device to route said barrier transaction request to said at least one recipient device behind transaction requests previously received from said first initiator device and routed to said at least one recipient device, said control circuitry being configured to maintain an order of at least some of said previously received transaction requests with respect to said barrier transaction request and in response to a response signal to said barrier transaction request to route said response signal to said first initiator device, said response signal providing an indication to said first initiator device that said at least some of said previously received transaction requests have reached a location of said response signal generator.

In some embodiments said at least a subset of transaction requests are memory management operation requests and said synchronise request is a memory management synchronise request querying when said memory management operation requests have completed and when previously issued transaction requests whose status would be affected by said memory management operation requests have reached a predetermined point within said interconnect.

In some embodiments said memory management operations comprise management of virtual to physical address translations and said at least some transactions that said barrier transaction maintains an order of comprise transactions using virtual to physical address translations current before said memory management operations are performed.

Where translation tables are being managed it is important that previously issued transaction requests using the old tables have reached a certain point before the tables are changed, barrier transactions following these transaction requests is a simple and elegant way of determining when this is the case.

In some embodiments, said interconnect comprises a response signal generator for generating said response signal in response to receipt of said barrier transaction request.

Although, the response signal generator may be in the recipient device that receives the transaction requests, which may be a device that actions the transaction requests or may be another interconnect, it may be advantageous if it is within the interconnect and can send a response signal early to the barrier transaction request. It may be important that the initiator device knows that the transaction requests have reached the recipient. However, in many cases the interconnect may be arranged such that at a certain point within the interconnect the transaction request has traveled far enough for the issue of further transaction requests to remain synchronised with the earlier transaction requests if they are issued to the interconnect at this point. For example, if the interconnect is arranged in such a way that paths from different ports merge early on in the interconnect then at a point beyond these merge points, a response and subsequent transaction requests can safely be sent. Clearly responding early reduces the latency of the system and improves performance.

In some embodiments, said interconnect circuitry comprises at least one domain, said at least one domain comprising at least one of said at least one inputs for receiving transaction requests from said at least one initiator device, a domain boundary being arranged such that any merging of transaction requests received from said at least one input occurs within said at least one domain; and said synchronise request comprising an indicator indicating which of said at least one domain it applies to; and said response signal generator being located at an exit point of said at least one domain; said response signal generator being responsive to detecting said barrier transaction request passing said exit point to generate a response signal; said control circuitry being configured to transmit said response signal to said initiator device from which said barrier transaction request was received.

As noted previously the interconnect circuitry can comprise a number of domains and if these are arranged so that merging of transaction requests occur within a domain then if a response signal generator is arranged at the exit to a domain then provided the domain indicator is selected so that one can be sure that transaction requests from the required initiator devices have merged at the exit to that domain then a response at this point is very helpful in indicating to the system that the transaction requests have proceeded to a point where they are visible to all of the initiator devices in question.

In some embodiments said control circuitry is configured not to transmit said barrier transaction further having transmitted said response signal to said initiator device.

In some embodiments the barrier transaction request is used to indicate to the initiator device when it has reached a certain point in the interconnect, this point being selected according to requirements. This is in many embodiments the sole purpose of the barrier transaction request and thus, once the response has been given it may be terminated and not transmitted further.

In some embodiments at least some of said plurality of paths are divergent paths diverging from a node, said control circuitry being configured to duplicate and transmit said at least some transaction requests and said following barrier transaction request along at least some of said divergent paths that said at least some transaction requests are routed along.

In the case that some paths are divergent, then it is important that if the transaction requests that are being followed by the barrier transaction request travel down both of the paths then the barrier transaction request needs to be duplicated and not responded to until responses from all of the duplicated barriers have been collected. In order to allow this to happen, in some embodiments said control circuitry comprises holding circuitry at said node, said holding circuitry being configured to hold response signals received from said duplicated barrier transaction requests and only to transmit said received response signals to said source of said barrier transaction request in response to receiving a response to all of said duplicated barrier transaction requests.

Yet another example embodiment provides a data processing apparatus comprising a plurality of initiator devices communicating with at least one recipient device via an interconnect, at least one of said initiator devices being an initiator device according to a second aspect and said interconnect being an interconnect according to a third aspect.

A method of synchronising a data processing apparatus comprises a plurality of initiator devices issuing transaction requests to at least one recipient device via an interconnect said method comprising the steps of: issuing a synchronise request querying whether progress of at least a subset of transaction requests; and routing said synchronise request to said at least one other of said plurality of initiator devices that is configured to action said at least a subset of transaction requests; issuing a barrier transaction request from said at least one other of said initiator devices; routing said barrier transaction request along at least one of said plurality of paths behind transaction requests previously received from said at least one other initiator device to said at least one recipient device to maintain an ordering of at least some of said previously received transaction requests and said barrier transaction request in a transaction request stream; and in response to a response signal to said barrier transaction request routing said response signal to said at least one other of said plurality of initiator devices, said response signal providing an indication to said at least one other initiator device that said previously received transaction requests have reached a location of said response signal generator; generating an acknowledge signal responding to said synchronise request and routing said acknowledge signal towards said first initiator device.

A method of determining when to respond to a received synchronise request comprises the steps of: issuing transaction requests to a recipient device via an interconnect; receiving a synchronise request querying progress of at least a subset of transaction requests from said interconnect; actioning any pending transaction requests within said at least a subset of transaction requests; generating a barrier transaction request and issuing said barrier transaction request to said interconnect; in response to receiving a response to said barrier transaction request issuing an acknowledge signal as a response to said synchronise request.

BRIEF DESCRIPTION OF THE DRAWINGS

FIGS. 9a, 9b and 10 schematically show how an interconnect can be divided into different domains, some barriers being treated differently depending on the domain they are in.

DESCRIPTION OF NON-LIMITING EXAMPLE EMBODIMENTS

Figure 1:
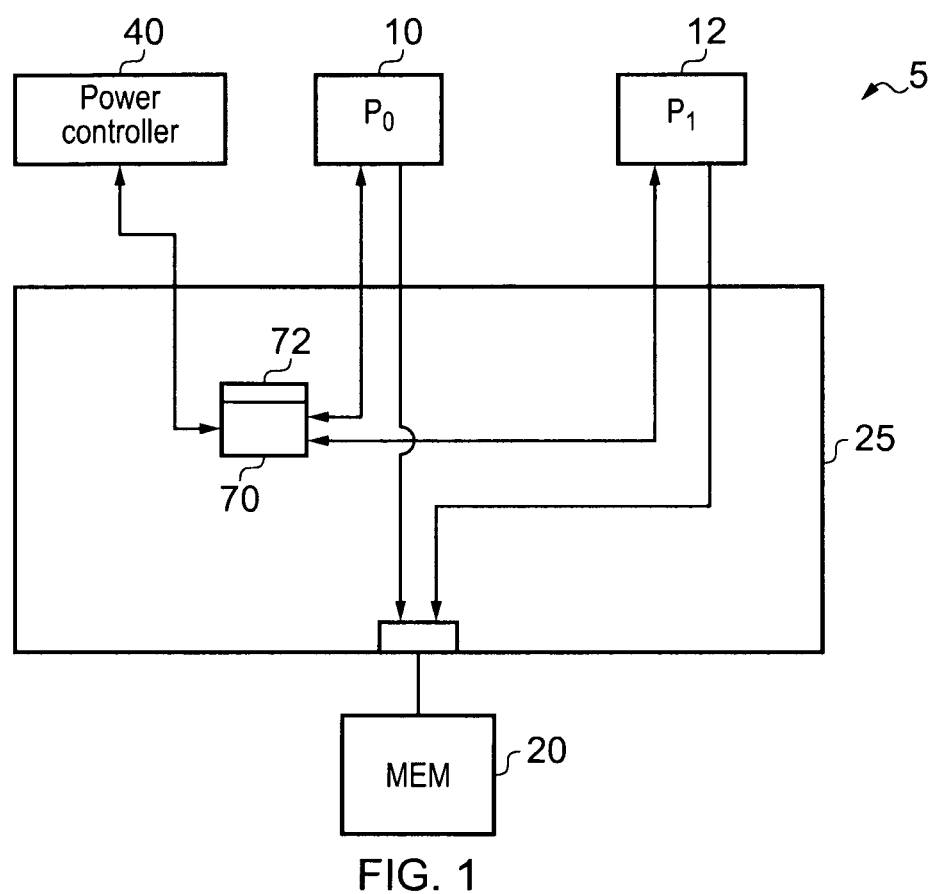
FIG. 1 shows a data processing apparatus with a power controller according to an example embodiment.

FIG. 1 shows schematically a data processing system 5 having two processors 10 and 12 communicating with a memory device 20 via interconnect 25. There is also power controller 40 that is used to initiate low power mode during periods of inactivity and thereby reduce the power consumption of the system 5. In order for the power controller to safely power down the system, it needs to determine if any outstanding transaction requests issued by processors P0 or P1 have completed. Therefore, it sends a synchronise request to interconnect circuitry 25 and control circuitry 70 within the interconnect, routes the synchronise request to both P0 and P1. In response to receipt of the synchronise request, processors P0 and P1 issue any outstanding transaction requests to the interconnect 25 and then issue a barrier transaction request such that they know when their transaction requests have completed. The barrier transaction requests follow the earlier transaction requests along the paths that they take and at a point where it is safe to power down the processor issuing the barrier transaction request, a response is generated to the barrier and this response signal is routed via control circuitry 70 towards the power controller via holding unit 72. A first response received is held in holding unit 72 until a response to both barrier transaction requests have been received then a single response is sent to power controller 40 which powers down the system. It should be noted that the synchronise signal sent by the power controller may have an indicator associated with it indicating which part of the system is to be powered down. Depending on the parts of the system to be powered down, the processors P0 and P1 may generate barrier transaction requests that have indicators associated with them indicating a point in the system that responses can be given from. This ability to provide barrier transaction requests with indicators that specify from where a response can be given will be described later.

Figure 2:
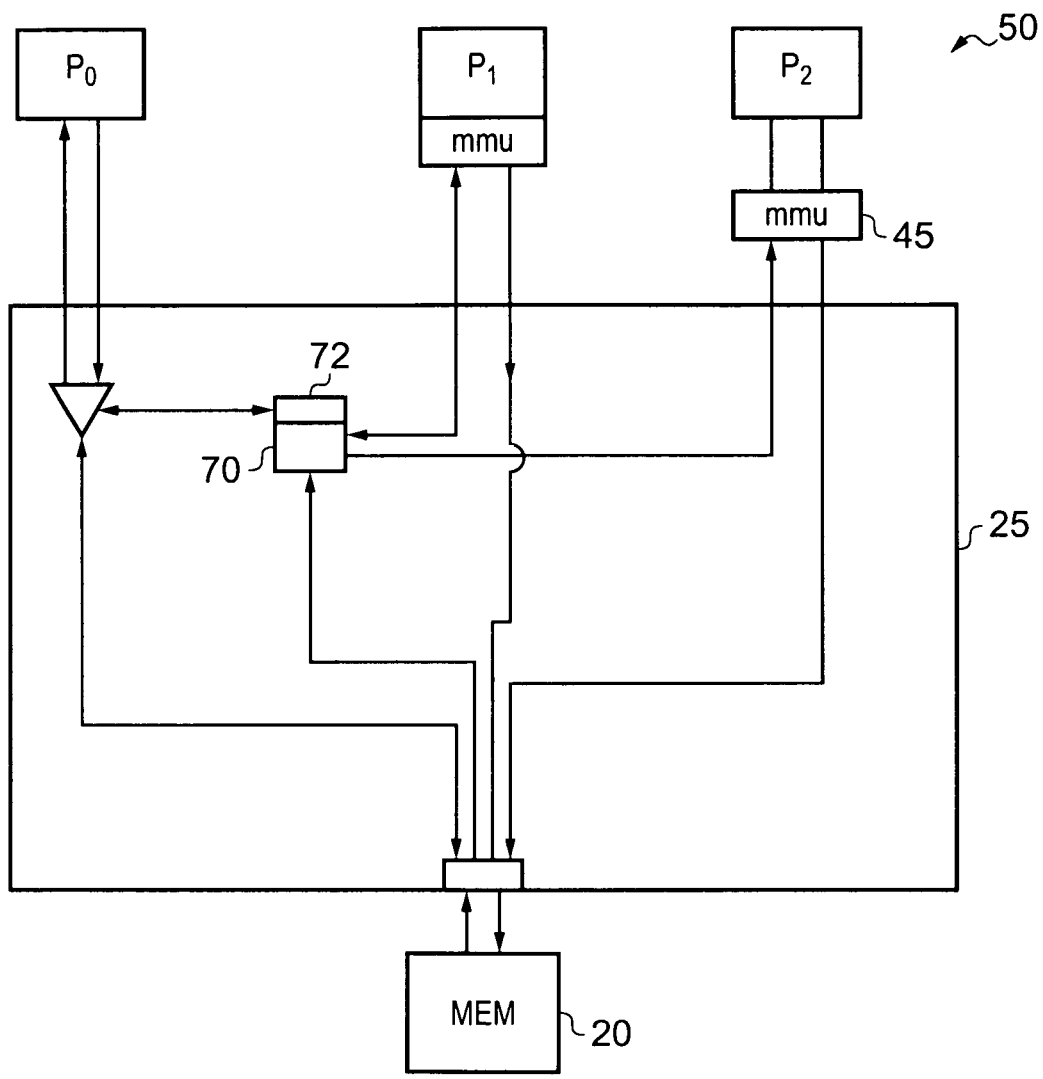
FIG. 2 shows an interconnect that synchronises memory management operations.

FIG. 2 shows a data processing system 50 according to an example embodiment. System 50 has interconnect 25 and various processors P0, P1 and P2 that communicate via interconnect 25, with each other and with memory 20. Processor P1 has a memory management unit in addition to the processor. Processor P2 uses an external memory management unit 45 that it sends transactions through on the way to interconnect 25.

In this embodiment, processor P0 may generate memory management operations to be performed by the memory management unit of P1 and memory management unit 45 and at a certain point when it wishes to know that these have completed, it will transmit a synchronise request to interconnect 25. Control circuitry 70 receives the memory management operation requests and routes them to the various MMUs as appropriate. Then, when it receives the memory synchronise request, it duplicates it if required and routes the synchronise request(s) to the MMU(s) that it has routed the memory management operation requests to.

Once it is has issued the memory management synchronise request, the processor P0 then issues a synchronise barrier and blocks the issue of further transactions. This is because at this point, the further transactions need the memory management operations to have been actioned before they can safely be issued. It was for this reason that a synchronise request was issued.

However, transactions previously issued by P1 and P2 will want to complete before the memory management operations become effective. For this reason, in response to receiving the synchronise request, each memory management unit will action the memory management operations but they will also send a barrier generated by a barrier generator (not shown in this Figure) to interconnect 25. The barrier will follow the previously issued transactions that need to complete before the memory management operations become effective. Thus, if the memory management operations are the flushing of translation tables translating virtual to physical addresses, any transaction request that uses the old translations must complete before the memory management operations are complete. Thus, the barrier follows these transaction requests through interconnect 25 and at a point that these transaction requests are visible to processor P0 that issued the memory synchronise request a response is generated to these barrier transaction requests and this response is sent back to the MMU that issued the barrier.

Each MMU receives a response to its barrier transaction request and if it has completed its outstanding memory management operations then it will send an acknowledge response signal to the memory management synchronise request. This is routed to the control circuitry 70 and is held within the holding circuitry 72 until responses to all the duplicated memory management synchronise requests have been received. In this case, two responses are required. When the two responses have been received, control circuitry 70 will transmit the synchronise acknowledge response to processor P0. Processor P0 will await this response and the response to its own synchronise barrier and when it has received both of these then it can transmit the further previously blocked transactions to the interconnect 25.

The point at which the barrier responds, which is the point when P0 has visibility of the transaction requests sent by P1 and P2, will be described in more detail with respect to FIG. 5.

Figure 3:
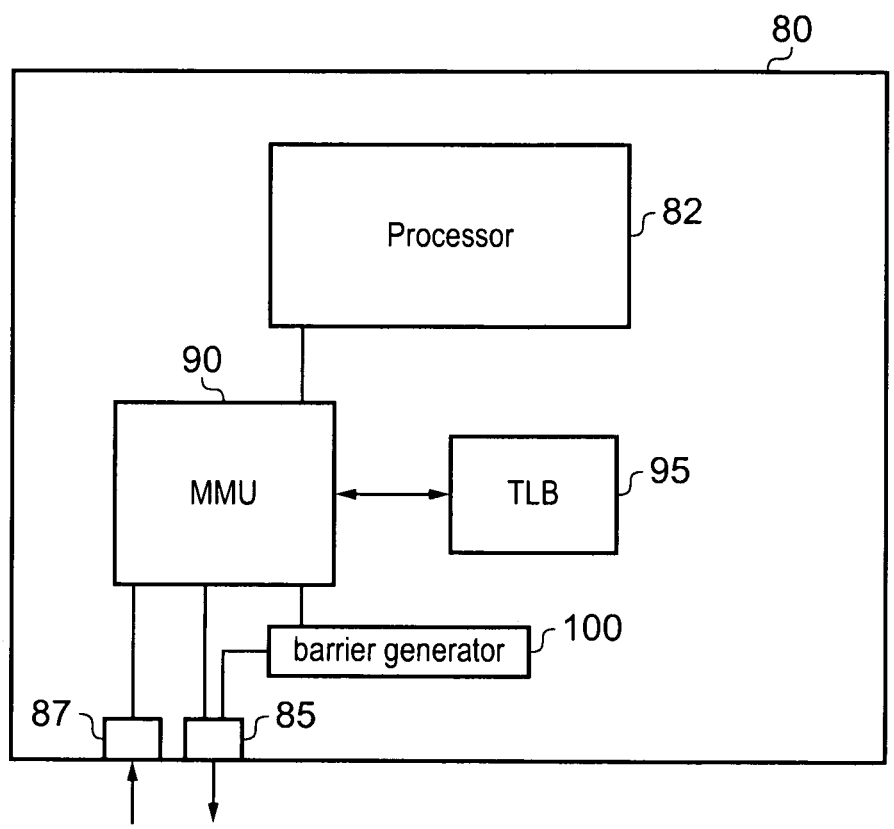
FIG. 3 shows an initiator device according to an example embodiment.

FIG. 3 shows an initiator device 80 according to an example embodiment. This initiator device has a processor 82 that sends transaction requests via port 85 to an interconnect. If these transaction requests include memory management operation requests then some of these are actioned by its own MMU 90 and some are transmitted to the MMU of other initiator devices connected to the interconnect. Memory management unit 90 communicates with a translation lookaside buffer TLB 95 and uses translation tables stored within this buffer to translate virtual addresses within instructions sent by the processor to physical addresses that are used by the data stored within the processing system. The memory management operations will generally relate to updating these translation tables and when subsequent instructions use the new translations, it is important to know that not only that one's own translation lookaside buffer is updated, but also the translation lookaside buffers used by other MMUs accessing the same memory space are also updated.

In order to ensure that this is the case, processor 82 will send a memory management synchronise request and this will be routed by the interconnect to the various MMUs. Furthermore, barrier generator 100 will generate a synchronisation barrier and will transmit this through port 85 to follow the previously issued transaction requests that used the earlier translations. This barrier will sit behind these transaction requests and when a response to this barrier is received from a response signal generator one can be sure that the earlier transaction requests have also reached this point.

Once the initiator device 80 has received a response to the barrier generated by barrier generator 100 and an acknowledge response responding to the memory synchronise request then it can issue the subsequent transactions that used the new translations that it has up to this point blocked. At this point, it knows that the earlier transaction requests that used the old translations have reached a point at which the new translations can be implemented and the new translations are implemented to such an extent that the further transactions can be transmitted.

In addition to issuing memory synchronise requests, initiator device 80 may also receive them from other initiator devices at port 87. These synchronise requests follow memory management operation requests that have previously been received and that request memory management operations such as the flushing of translation tables in the TLB 95 to be implemented. In response to receiving a memory synchronise request, the MMU 90 will perform any pending memory management operations that it has not yet performed and will generate at barrier generator 100 to follow behind transaction requests that have previously been issued and that use the old translations. When it has received a response to the barrier transaction request and it has completed the memory management operations it will send a synchronise acknowledge response in response to the memory synchronise request.

Figure 4:
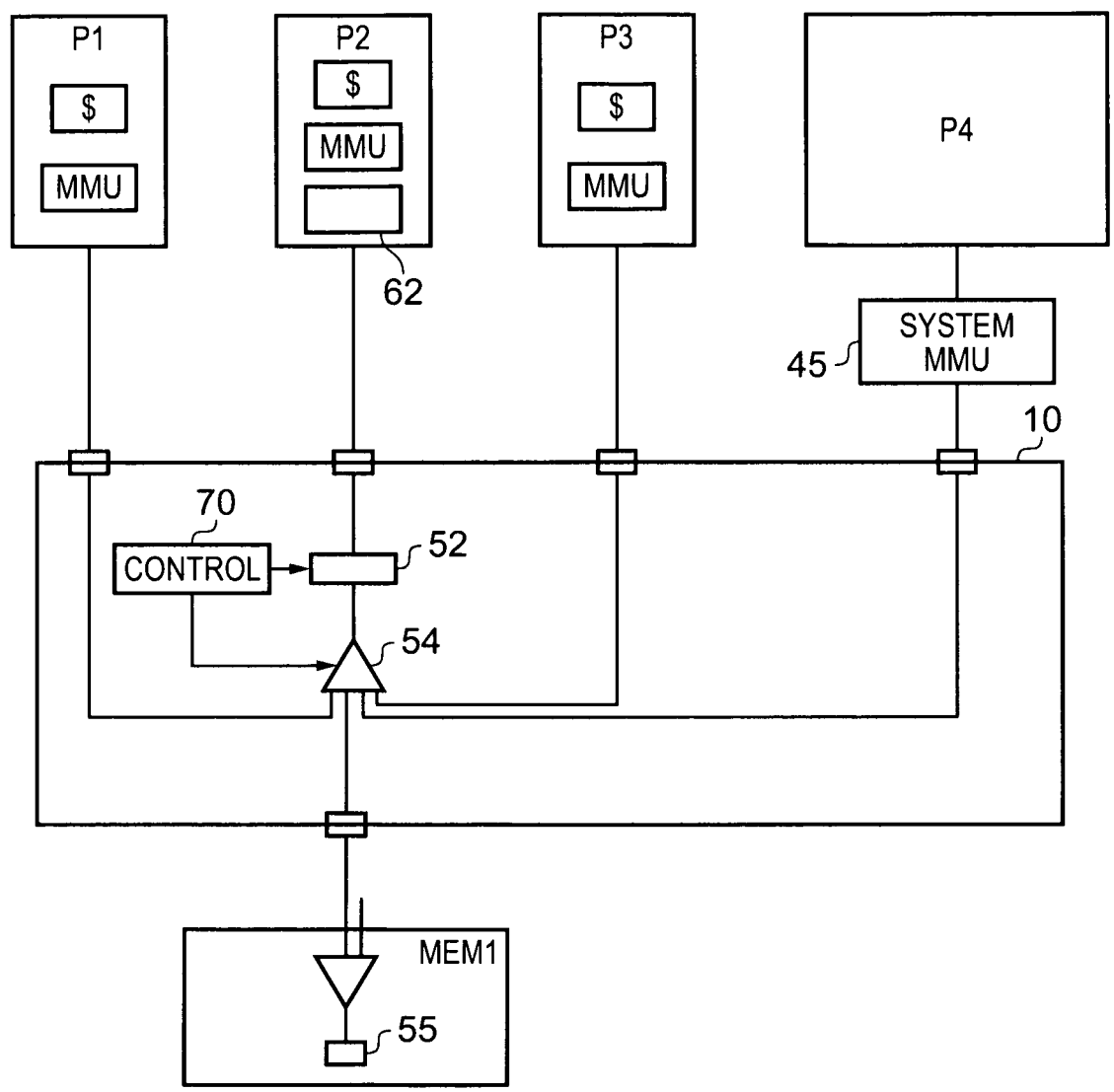
FIG. 4 shows a data processing apparatus having a plurality of initiator devices, an interconnect and a recipient device according to an example embodiment.

FIG. 4 shows processors P1, P2, and P3 each having a cache and their own memory management unit (MMU). There is also another initiator device P4 that does not have a memory management unit and this is connected to the interconnect 10 via a system MMU 45 so that it too can access memory MEM.

Memory management units (MMU) are used to enable a processor that uses virtual addresses to communicate with a memory that uses physical addresses. Thus, the MMU will hold virtual to physical address translation tables that map the virtual addresses to the physical addresses and accesses from the processor to the memory will use these tables. In a multi processor system such as that shown in FIG. 4, the memory management system is in effect a distributed system with several MMUs at different points within the system. These or at least a subset of these that use the same address translations must remain consistent with each other and thus, memory management transactions issued by one may have to be applied to the others. Thus, if for example the translation tables in one MMU are to be flushed and a new set of translations to be used, this memory management operation must be performed on all MMUs that use the same address translations. These memory management transactions have a long latency time and thus, can affect performance considerably. Furthermore, the system may have no way of knowing when some of these transactions are complete and barriers are a particularly effective way of managing the ordering requirements associated with these transactions.

Thus, if for example, P2 issued some MMU maintenance transactions to its MMU and to the interconnect, control circuitry 70 will forward the maintenance requests to the other MMUs that use the same address translations, these MMUs will all acknowledge receipt of these maintenance requests but they may not proceed further with them for some time or they may commence processing of them but as they require some time to process may not complete for a while. P2 may need to know at a certain point before it issues transactions that use new translations for example that the maintenance requests are complete. Thus, it will send a synchronisation request that follows the maintenance requests to its MMU and to the interconnect which will forward it to each of the appropriate MMUs. In this embodiment before subsequent transactions that use the new pages can be issued by P2, it needs to know that all transactions that used the old page tables have reached their destinations. Thus, in addition to sending the synchronise request, it also sends a synchronise barrier transaction request to follow previously issued transaction requests that it has issued itself and that use the old translations, it then blocks the issue of further transaction requests.

The MMUs will react to receipt of the synchronise request by issuing the maintenance requests and sending barriers to follow the maintenance requests. The barrier is used to follow previously sent requests that use the old translations and in this way a response to the barrier indicating it has reached its destination indicates that all pending transactions that will be using the old page tables will have reached their destination. When a response is received from the barrier at the MMU provided the MMU has actioned the memory management requests it will send an acknowledge response to the synchronisation request and this is stored in holding circuitry 52, until responses are received from all of the MMUs that received a synchronise request at which point a synchronisation reply is sent to P2 and provided P2 has received a response to the synchronisation barrier that it issued it can issue further transactions.

It should be noted that the barriers issued by the various MMUs in response to the synchronise request act to let the issuer know when all transactions issued in front of them that they control have reached a certain point. They do not block transactions behind them and as such have only a small increase in latency associated with them.

In the case of some memory management transactions it is important that no transactions are issued before the management operations are complete. For example if a new set of translations are to be used it is important that any transactions that use the new translations are not issued until the memory management transaction has completed everywhere.

In the case of the master P2 issuing a virtual memory management synchronise request, the barrier it generates at barrier generator 62 and sends after this synchronise request blocks at the master. The synchronise request will query all MMUs about any pending virtual memory management operations that they have and master P2 will not issue further transactions until it has received responses indicating that all pending virtual management operations have completed and a response from the barrier it issued indicating that the previous transactions that it issued have reached a certain point, in this case the response is given from response generator 55 within MEM1, but in other embodiments it may be given from an early response unit within the interconnect.

It should be noted that although these different features are shown for master P2, other circuits for controlling transactions issued by the other masters are present but not shown.

Figure 5:
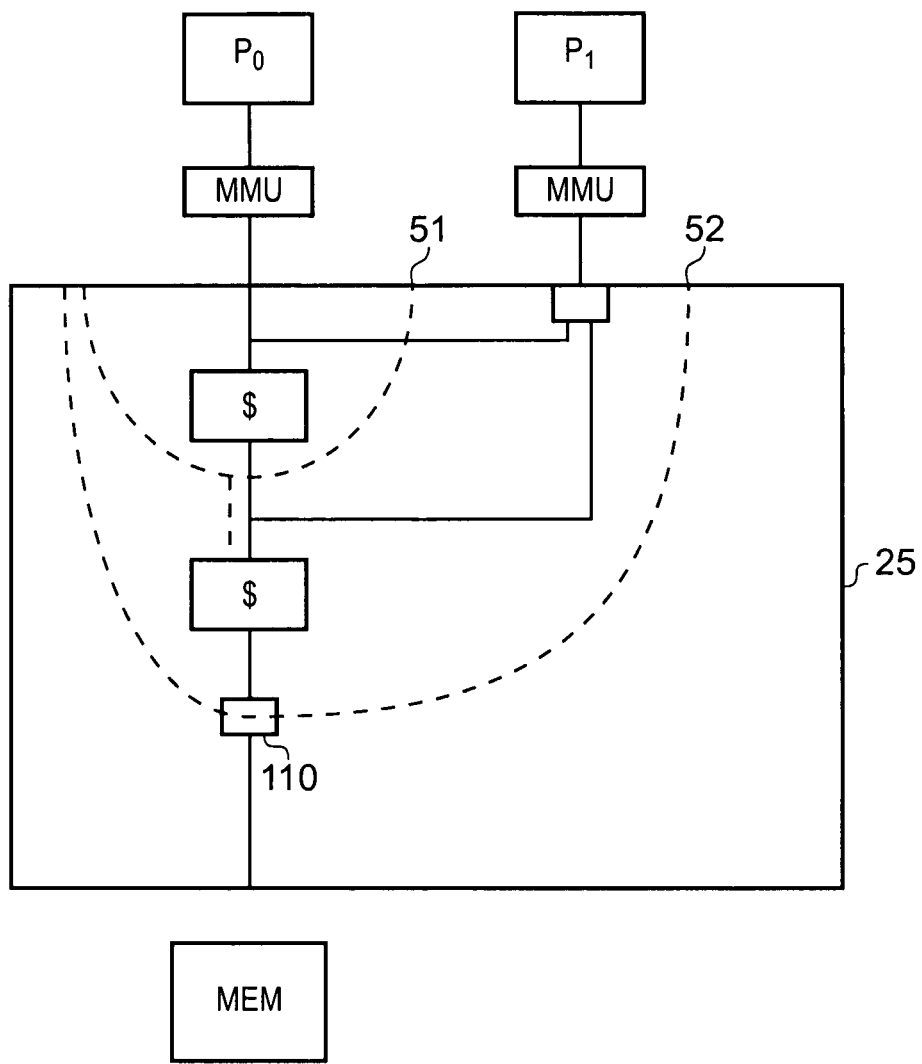
FIG. 5 shows a data processor having an interconnect with different domains according to an example embodiment.

FIG. 5 illustrates how some domains can be used in example embodiments. In this embodiment, interconnect 25 has domains indicated by dotted lines 51 and 52. Dotted line 52 indicates a domain within which transactions from P0 and P1 will have merged. There is an early response generator 110 at the exit to domain 52 and once transaction requests have passed this point they have merged with transaction requests from the other processor and thus, are visible to both. Thus, if the system had just the two processors P0 and P1 a response from response generator 110 to a barrier transaction request would indicate that the barrier and thus, any transaction requests that it controlled had reached a point at which the transactions of each processor are visible to the other processor.

Thus, in the case of memory management operations performed on translation tables translating virtual to physical addresses, once earlier transaction requests using the old tables have reached this point, then the new translation tables can be implemented. Thus, if a domain indicator is added to any barrier transaction request indicating that no response is allowed within the domain bounded by 52, a response to the barrier will indicate that the transaction requests have exited this domain. A response generator located on the domain boundary means the response is sent as soon as this condition is fulfilled. It should be noted that in some embodiments the synchronise transaction request may itself contain an indicator indicating a domain outside of which transactions that it is synchronising need to be before synchronisation occurs. If this is the case, the barrier generator can acquire all the information it needs regarding where a response can be sent from the synchronise request and it simply adds the domain indicator of the synchronise request to the barrier.

Figure 6:
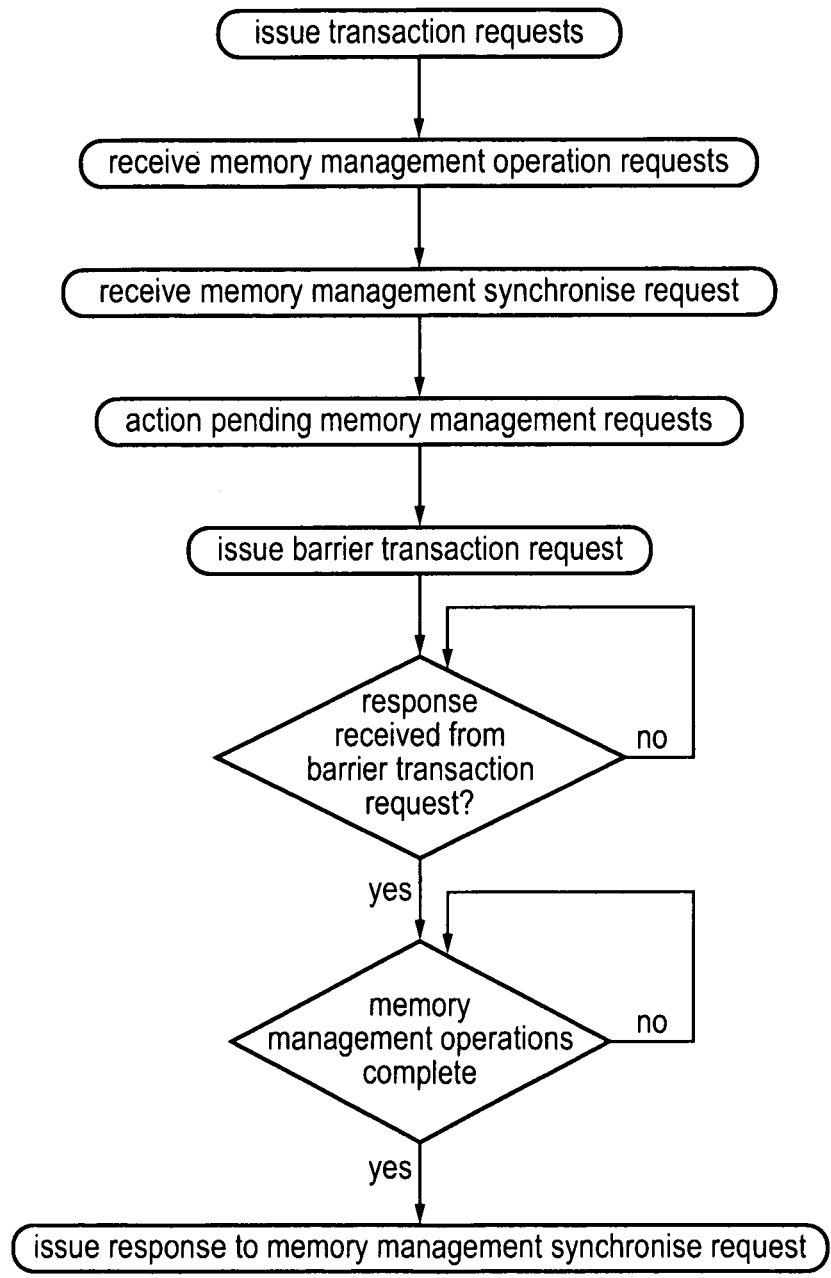
FIG. 6 shows a flow diagram illustrating steps in a method of responding to a synchronise request in an initiator device.

FIG. 6 shows a flow diagram illustrating steps in a method of responding to synchronise requests in a master according to an example embodiment. The master issues transaction requests to an interconnect. It then receives memory management operation requests, which it acknowledges and may or may not action immediately. It then receives a memory management synchronise request whereupon it actions any of the pending memory management requests that it has not yet actioned and it issues a barrier transaction request that follows the earlier transaction requests that it issued.

When a response has been received from the barrier which indicates that the earlier transaction requests have proceeded beyond the point at which a response is given and when it has completed the memory management operations it will respond to the synchronise request. In this way this initiator device indicates that it has performed the required memory management operations and that its earlier transactions have progressed beyond a certain point, this point being the location of the response signal generator that issued the response. As noted with respect to earlier figures this point can be selected with appropriate properties of the barrier.

Figure 7:
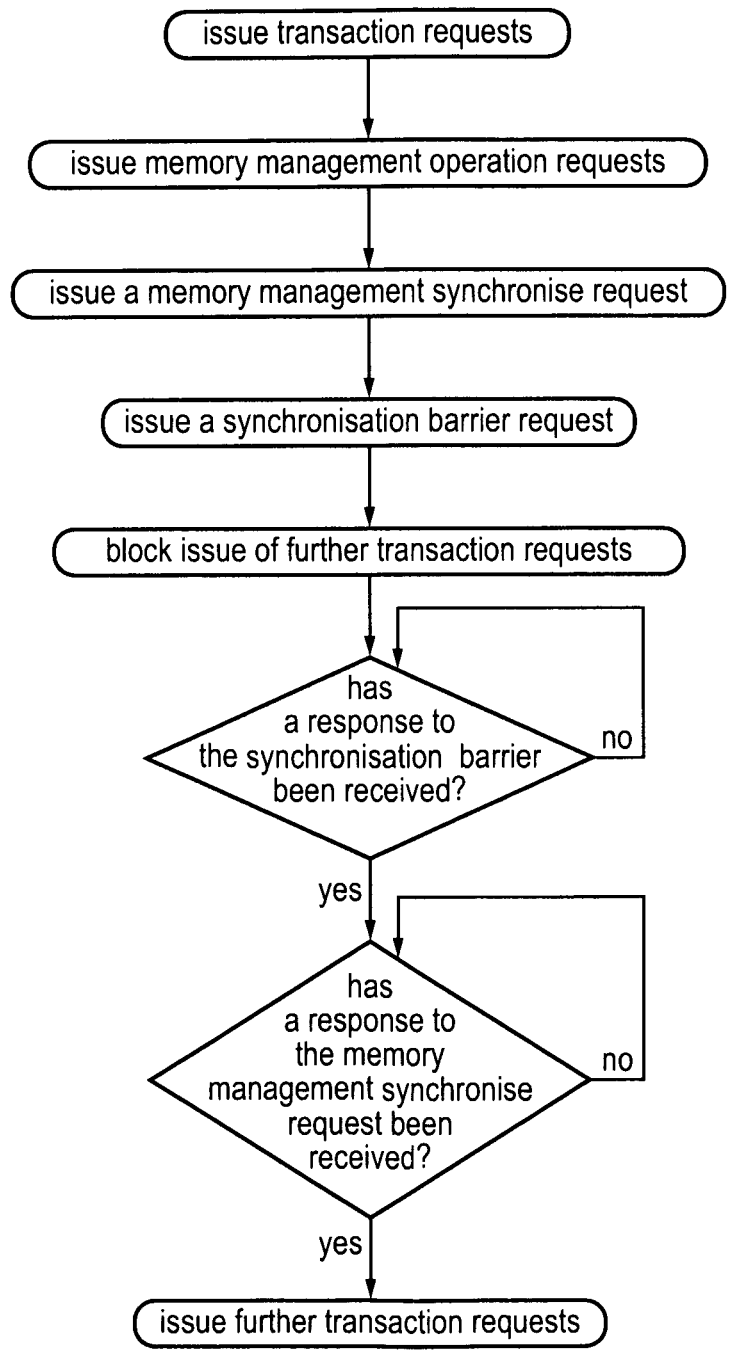
FIG. 7 shows steps in a method for generating a synchronise request in an initiator according to an example embodiment.

FIG. 7 shows a flow diagram illustrating steps in a method performed by an initiator device communicating with a recipient and at least one other initiator device via an interconnect and requesting memory management operations and synchronisation. The initiator device issues transaction requests, and then when memory management operations are required it issues requests to be sent to other initiator devices. At a certain point in the processing it needs to know that these have been performed so it issues a memory management synchroniser request and it also issues a synchronisation barrier request. The synchronisation barrier request is issued to the interconnect and travels through the interconnect behind previously issued transaction requests that are travelling to a recipient and need to have progressed beyond a certain point before the memory management operations become effective.

Having issued the synchronisation barrier request the initiator device blocks the issue of further transaction requests as these require that the memory management operations have been actioned. When a response to both the synchronisation barrier and the memory management synchronise request have been received the initiator removes the blockage of the further transaction requests and these can be issued to the interconnect.

Figure 8:
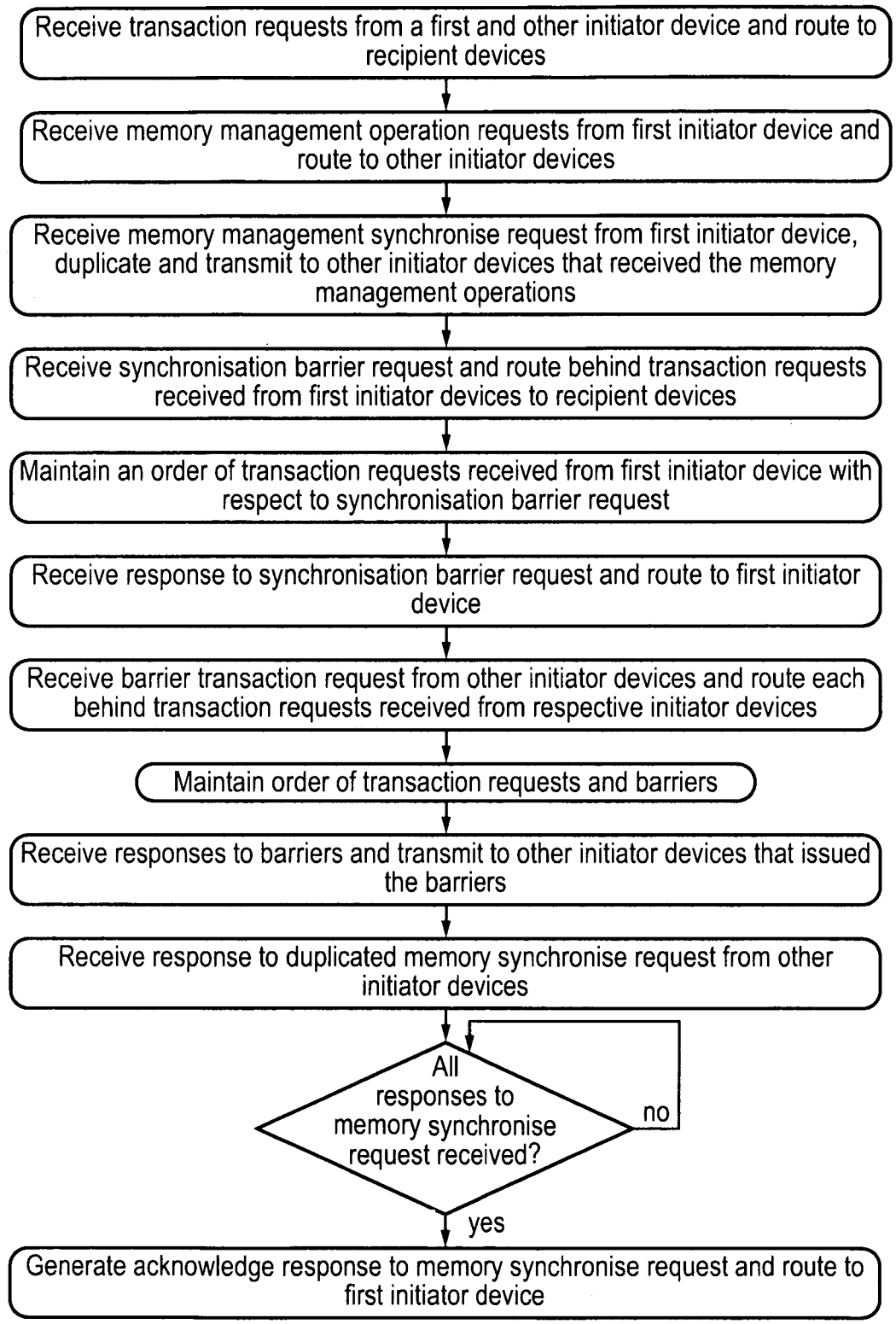
FIG. 8 shows a flow diagram illustrating steps in a method of synchronising memory management operations according to an example embodiment.

FIG. 8 shows a flow diagram illustrating steps in a method of routing transaction requests within an interconnect of a data processing apparatus having several initiator devices connected to at least one recipient device via an interconnect. In a first step transaction requests are received from a first and other initiator devices and are routed to one or more recipient devices. Memory management operation requests are then received from a first initiator device and these require memory management operations to be performed by other initiator devices and so they are routed to these other initiator devices. These initiator devices may be stand alone MMUs or they may be processing devices with MMUs. A memory management synchronise request is then received from the first initiator device and this request is querying whether the memory management operation requests have been actioned and the progress of other transaction requests issued by the other initiators that should have reached a certain point in the interconnect before the memory management operations are complete. The memory synchronise request is duplicated and transmitted to the other initiator devices that received the memory management operation requests.

A synchronisation barrier request is then received from the first initiator device and routed behind transaction requests received from the first initiator device travelling to the recipient devices. The interconnect circuitry maintains an order of transaction requests received from the first initiator device with respect to the synchronisation barrier request so that this synchronisation barrier request provides an indication to the first initiator device of the progress of the transaction requests that it is following.

A response to the synchronisation barrier request is then received and routed to the first initiator device that then knows that the transaction request preceding the synchronisation barrier request have reached the location of the response signal generator.

Barrier transaction requests are then received from other initiator devices and routed behind transaction requests received from the respective other initiator devices. The order of transaction requests with respect to the barriers is then maintained by the interconnect control circuitry.

Responses to the barriers are then received and transmitted to the respective other initiator devices that issued the barriers, in this way these initiator devices are aware that the transaction requests travelling before the barriers have also arrived at the location that issued the responses. In this way they can determine when to respond to the synchronise requests that they received.

Responses to the duplicated memory synchronise requests are then received from these other initiator devices and when all of them have been received an acknowledge response is sent to the first initiator device. In this way the use of barriers and their control through the interconnect is used to determine the progress of various transaction requests and allow the different components to be synchronised.

As noted previously interconnects can be divided into domains and if the properties of the domains are chosen appropriately then a response at an exit to a domain can be used to indicate to an initiator device that a certain transaction request has reached a point where it is say visible to a certain number of other input ports.

In general there are a number of different ways of grouping masters and portions of the interconnect into different domains and controlling the barriers and transactions within the domains to ensure that the correct ordering of transactions is maintained while not unduly increasing latency. In this regard, it has been recognised that if certain rules are imposed on the topology of the interconnect relating to the domains, then the barriers will have certain properties that can be exploited to reduce the latency of the barriers. Arranging the domains in particular ways may produce constraints in the permitted topologies of the systems but may also decrease the latency produced by barriers, thus there are advantages and disadvantages to the different possible implementations of domains that are described below.

In all of the arrangements of domains, if a barrier transaction is marked as relating to a particular domain, when it is outside of that domain it can always be responded to except in a reconvergent region, while certain types of barrier can not be unblocked when they are inside the marked domain.

In a first "null" implementation no account is taken of these domains. All barriers are treated as applying to all transactions in all parts of the system. This clearly is low in performance in that latency from the barriers will be high. However, it does permit unrestricted, arbitrary domain membership (even if that membership has no effect) and topology and so can always be built. This is logically equivalent to all domains including all masters in all their domains.

In an alternative "nearly null" implementation there are non-shareable domains that relate to each master and barriers related to these domains are treated differently outside of this domain. As a non-shareable barrier is outside its shareability domain everywhere beyond the input from the master, it can be treated as such in the whole interconnect and therefore be responded to in all non reconvergent parts of the interconnect. Other shareability domain barrier transactions are treated as in the null implementation. This is logically equivalent to making the non-shareable domain boundary the issuer or master input, and all other domains contain all other masters.

An alternative "simple" implementation has some restricted topology and improved performance. This approach yields two different solutions depending on the level of restriction that may be accepted.

Three restrictions on shareability domain membership are common to both of these approaches:
1. An observer's non-shareable domain is itself alone.
2. An observer's system shareability domain comprises at least all other observers that it can communicate with directly or indirectly.
3. All members of an observer's inner shareable domain are also members of its outer shareable domain.

The first two of these are the restrictions imposed by [3]. In addition, each of the two solutions has specific topological restrictions and possibly additional shareability domain membership restrictions.

The first of these two implementations requires a restriction that each location is in a single domain, and thus, depends on each location in the interconnect being in only one kind of domain, inner, outer or system. To enable this, an additional shareability domain membership restriction must be enforced:

All members of any shareability domain of any observer must have all other members of that shareability domain as members of their same level of shareability domain. I.e. if observer B is a member of observer A's inner shareable domain, then reciprocally A must be a member of B's inner shareability domain.

The topological restrictions that must be met are:
1. The domain boundary must include all members of the domain
2. Nothing outwith a domain may merge into the domain—i.e. the domain boundary must not include anything that is downstream of anything not inside the domain boundary
3. All domain boundaries must lie on domain bisection links A simple way to think of the domain boundaries in this case is as topographical contour lines representing altitude (where vertical faces are permitted, but overhangs are not). Each master is at the same height, and each shareability domain contour is at the same height as all others of the same type. Vertical cliffs are permitted to allow shareability domains of the different types to be identical, but overhangs, which would allow the crossing of shareability domains are not.

These topological restrictions require that nothing may merge into the domain—neither members of the domain (which would violate restriction 1) nor non-members (which would violate restriction 2) If a split downstream of a member exits the domain and then re-merges into it without also merging with something outwith the domain then the part between exit and re-entry is effectively still in the domain.

The topological and domain membership restrictions combined ensure that, within its shareability domain, a barrier cannot encounter a transaction from an observer outwith that domain and that when it exits the domain it will have merged with all transaction streams from all members of the domain that it will ever merge with. They also ensure that any location that is outside of any inner shareable domain is outside of all inner shareable domains, and if outside of any outer shareable domain is outside of all outer shareable domains.

As a result of this, the requirement for a barrier to be blocking at a split point may be determined by simply comparing the shareability domain of the barrier with the domain type that the split point lies within as the requirement that no member of the shareability domain can merge downstream of the location is met implicitly by the barrier being outwith that domain in such a constrained system.

This mechanism can be implemented by either explicit indication of the barrier being outwith its shareability domain, which would require an explicit detection component at domain exit points, or determination of that status at each relevant split point.

The second of these two implementations allows locations in multiple domains. This implementation depends on the indicated shareability domain of a barrier transaction being modified as it passes through the boundaries of shareability domains so that once it exits its shareability domain it becomes non-blocking by making the transition. As it passes out of an inner or outer shareable domain its indicated domain moves towards non-shareable, and when marked as non-shareable it is known to be outside its domain and so can be non-blocking.

In this case the additional restriction on shareability domain membership is looser:

For any two shareability domains, A and B, either all members of A must also be members of B or all members of B must also be members of A, or both (in which case A and B are identical). In other words, the domain boundaries may not cross.

The same topology restrictions are required:
1. The domain boundary must include all members of the domain To permit maximum flexibility of topology, it must just be possible to decompose the topology components (split and merge) so that the domain boundary may be drawn such that
2. Nothing outwith a domain may merge into the domain—i.e. the domain boundary must not include anything that is downstream of anything not inside the domain boundary
3. The domain boundary lies across domain bisection links Finally, an additional topological restriction is imposed to compensate for problems introduced by the looser restriction on domain membership:
4. No boundary location can be for a different number of domains for different masters excluding masters for which that location is already outwith their outer shareability domain.

Restriction 4 ensures that where a barrier has to be modified as it crosses a domain boundary, it crosses a boundary for all domains it is in. This ensures that the modification operation is not dependent on the originator of the barrier.

If a barrier is modified and acquires non-blocking status, it may of course be unblocked if it is on a bisection link, but in some circumstances it may be unblocked despite being on a cross-coupled link. If the links crossing the domain boundary are domain bisection links that is they are bisection as far as that domain is concerned, i.e. they do not merge with paths from their own domain, only with paths coming from other domains, then the modification of the barrier transaction happens there and the unblocking may also occur from that point.

Restriction 2 may be waived if, in addition to changing the indicated domain towards non-shareable on domain exit, the indicated domain is changed away from non-shareable on domain entry. This requires a domain indicator that does not saturate, or a restriction on the number of domains that may be entered so that saturation does not occur. In addition, this will result in barriers that have entered a domain being blocking of transactions from non-members of that domain due to their increased indicated scope.

Figure 9A:
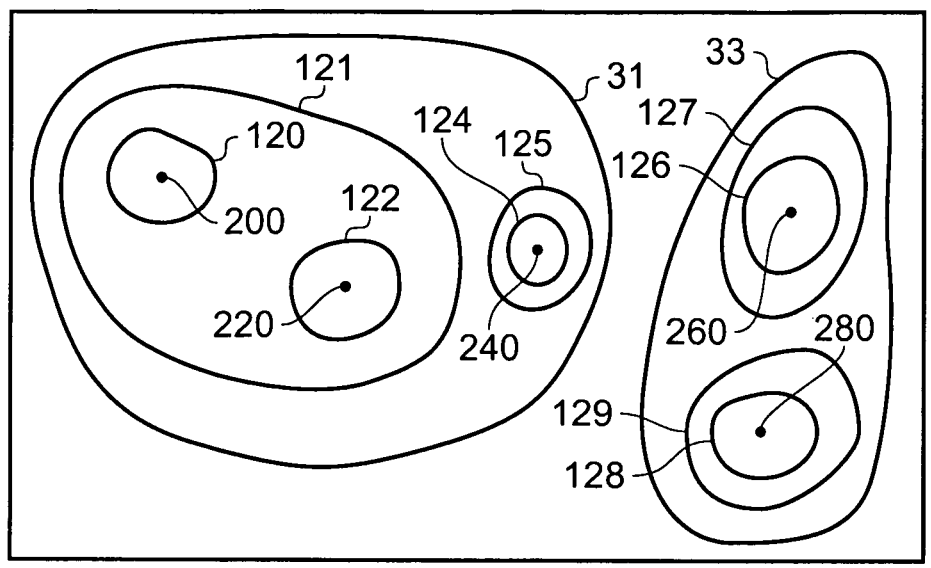

FIG. 9a shows very schematically the above implementation of domains within an interconnect. In this figure the masters are shown within the interconnect although in reality they are of course external to it. Each master 200, 220, 240, 260, 280 has a stream or non-shareable domain 120, 122, 124, 126, 128 immediately surrounding it which is relevant only to transactions generated by itself. There are then some next hierarchical level domains which may encompass a plurality of masters or simply the same master again thus, masters 200 and 220 have their non-shareable domain and then have an inner domain 121 around them, while master 240 has an inner domain 125, master 26 has a non-shareable domain 126 and an inner domain 127 and master 280 has a non-shareable domain 128 and an inner domain 129. There are then outer domains which surround them which in this case are domains 31 and 33. There is then the system domain which is the whole interconnect. As can be seen domains lie completely within each other and do not intercept in any way. There is also a constraint that all exit paths from domains are bisection paths. By constraining the domains in this way one can be sure that transactions leaving these domains will do so in a certain way, and as they leave on bisection paths provided that within the domain the barriers function correctly they will leave in a correct order. This allows control of the barrier transactions with respect to these domains in a particular way.

Figure 9B:
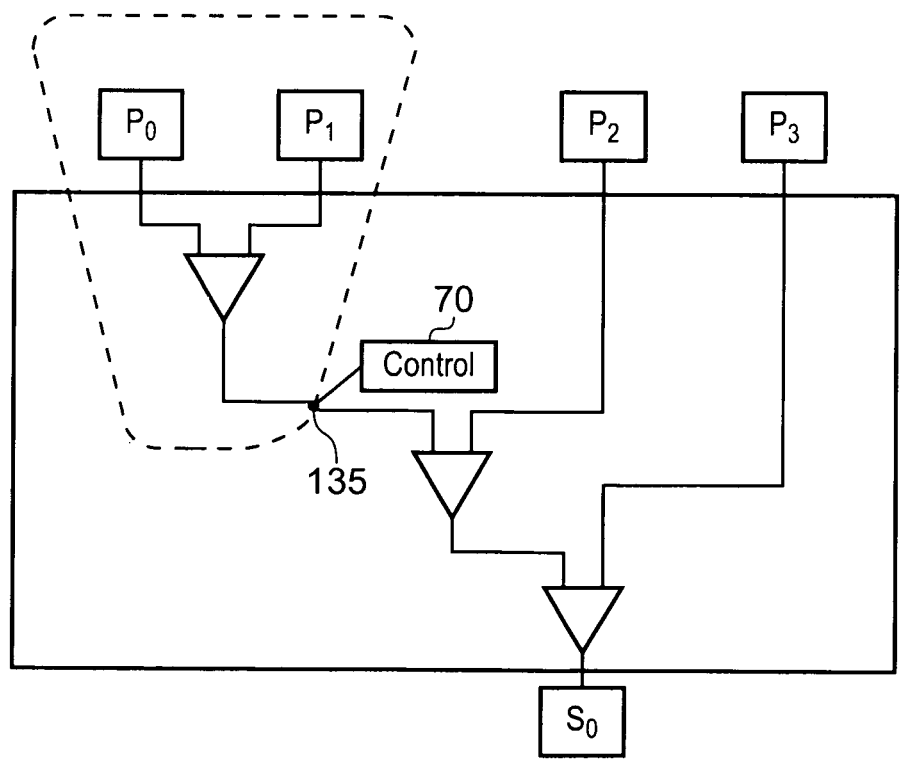

FIG. 9b shows schematically an exit node 135 to a domain that includes masters p0 and p1. This exit node 135 is controlled by control circuitry 70 and at this node it is known that any barrier transaction and the transactions it controls are in the correct order. Now as noted previously barrier transactions do not necessarily control all transactions but may control transactions generated by particular masters or transactions of a particular function.

In the case of shareability domains, barrier transactions are marked as controlling transactions from particular domains. Thus, a transaction may be marked as a system barrier transaction in that it controls all transactions, it may be marked as controlling transactions from a stream or non-shareable domain, from an inner domain or from an outer domain. In any case, when a barrier transaction exits a domain it can in this implementation have this hierarchical level reduced so that if it were an outer domain barrier when it exited the inner domain it will be reduced to a barrier transaction controlling transactions from an inner domain and when it exits the outer domain it will have the hierarchical level of its control reduced to a non-shareable domain where no transactions need to be delayed by it. This is possible as at this point all the transactions are ordered with respect to this barrier and provided there are no re-convergent paths then the interconnect is sure that the ordering will be correct. It should be noted that system barriers do not change on exiting domains as they always apply to everything everywhere.

It should be noted that if there are reconvergent paths within a domain then any non-blocking barrier must become blocking across the reconvergent region. If a further interconnect that introduces re-convergent paths is connected to an interconnect having domains then the domain system of controlling barriers no longer works. If an interconnect is added that affects the domains and their hierarchy then the system is controlled such that the shareability domain indicator in the barrier transaction is not reduced when it exits the domain.

It should be noted with respect to reconvergent regions, that some transactions to particular addresses may be restrained to pass along a particular route through the reconvergent region and in such a case the reconvergent region is not reconvergent for that address, An interconnect may be constrained so that transactions pass along a particular route to a particular address for all addresses, in such a case any reconvergent region may be treated as a cross coupled region, which may be advantageous owing to the considerable constraints on the system that a reconvergent region imposes.

Owing to the way the interconnect is configured, any barrier transaction within a domain that is not marked as a non-shareable barrier will in effect control transactions of any domain that it encounters as it will not encounter transactions from another domain. A barrier transaction that is marked as a non-shareable barrier will not delay any of the transactions subsequent to it, however, no transaction will be allowed to be reordered with respect to this transaction. In this way, by arranging the interconnect domains in this way and by reducing the hierarchical level of the indicator on exit of the domains a simple way of determining whether the barrier transaction must delay all transactions it meets or none, is used without the need for the control components to know exactly which domain they are in within the interconnect.

A further possible implementation for the domains is the "complex" implementation. This can be used if the topological restrictions or domain membership restrictions above are considered too restrictive. Assuming the requirements on non-shareable and system domain membership are to be retained, the information required is an explicitly enumerated list of what combinations of barrier issuer and shareability domain may be considered non-blocking at that location. Thus, rather than being able to determine the blocking nature of the barrier from the barrier itself as in the implementations described with respect to FIGS. 5a and 5b, the blocking nature of the barrier is determined from the location, the domain information being stored at the location.

This can be done with two lists at each relevant location, one for inner shareable domains and one for outer shareable domains. Each list indicates the set or barrier sources for which the location is outside of that domain. Alternatively, a list could be stored of sources with a two bit value indicating which shareability domains of that source the location is outside.

However the information is represented, it is clearly significantly more complex and more difficult to enable design reuse due to differing requirements to represent the domain information when a system is reused.

Figure 10:
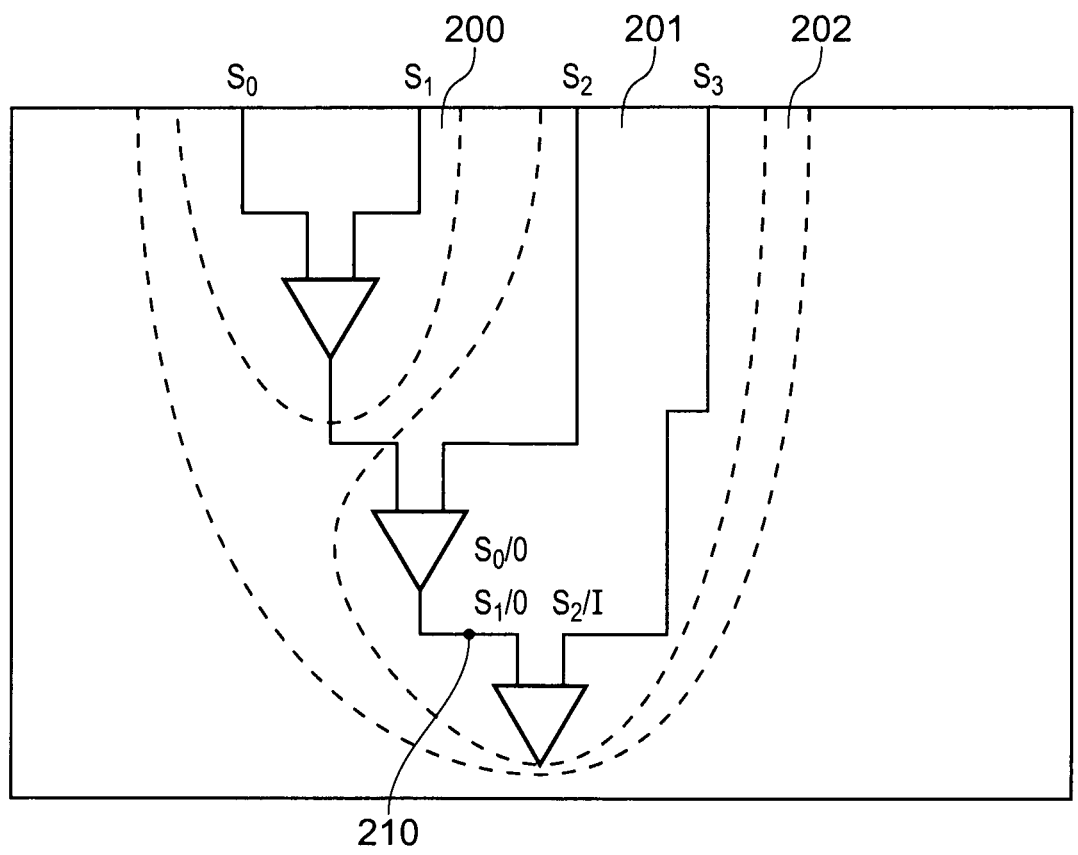

FIG. 10 shows an example of such an interconnect. This interconnect receives transaction requests from four masters, S0, S1, S2 or S3. S0 and S1 are in an inner domain 200, while S2 or S3 are in an inner domain 201 and they are all in an outer domain 202. There are other masters not shown that have other domains.

At location 210 one is in the inner domain for transactions coming from S2 and in the outer domain for transactions coming from S0 or S1. Thus, this location can be marked as such, and when barriers are received it can be determined which domain they relate to and thus, whether or not the barrier is outside of its domain. Thus, a barrier that applies to the S0, S1 inner domain is outside of its domain and it can be marked as such or an early response sent depending on the embodiment. This is clearly quite complicated.

An alternative to this is the conservative complex implementation. This is used if the topological and domain membership freedom of the complex implementation is required but the implementation and re-use issues must be avoided. In this case it is possible to make every component which must exhibit domain-location-specific behaviour consider itself to be in a particular level of domain and achieve correct behaviour. If the component considers itself to be in the smallest domain of any that it actually lies within then it will be conservative (yet correct) in its behaviour for barriers that are actually outside their domain and correct for those that are within their domain. In this regard it should be noted that the properties of barriers, domains or transactions can be changed where that may enable them to be treated more efficiently provided they are changed to be more restrictive. Thus, a barrier that is marked as inner can be treated as an outer barrier.

With this approach, the components that need to be domain aware can simply be programmed or configured to have a single domain (with a safe default of inner domain membership, this can be used on power up).

Thus, in this implementation a location within the domains is marked as having the properties of the domain with the most restrictive behaviour it is a member of, which is the domain of the lowest hierarchical level excluding the non-shareable domain. Barrier transactions at that location are then treated as being within such a domain. In such an arrangement domains are allowed to be a partial subset of other domains. In this arrangement rather than changing the marking on a barrier as it exits domains in order to adjust the blocking behaviour of the barrier without the need to know where in the interconnect one is, locations in the interconnect are marked as being in a particular domain, depending on the lowest hierarchical or smallest shareable domain they are located in.

In the example of FIG. 10 for example, the location 210 does not need to be marked with three different marks, it is simply marked with the smallest shareable domain that it is within, that is inner. Thus, in this case any barrier marked as being inner or outer is considered to be within this domain and a barrier from the S0, S1 inner domain will be considered to be within its domain, even though it is not. Thus, no early response can be sent and the latency of the interconnect will increase which is the downside of this approach. However the marking of the domain is simpler as is the determination of whether a barrier is within the domain or not.

Figure 11:
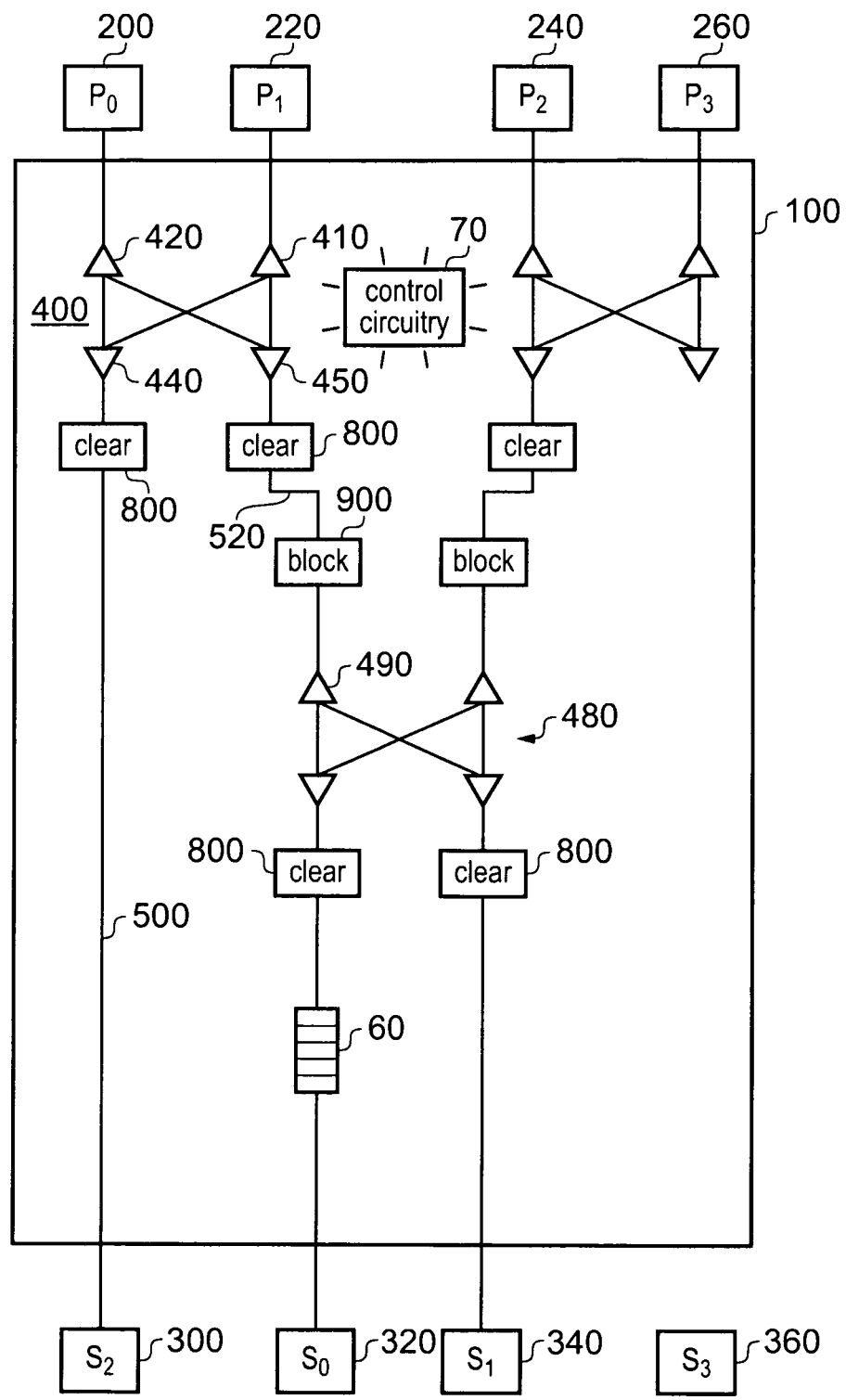
FIG. 11 shows an interconnect suitable for dealing with barriers in more detail.

FIG. 11 shows an interconnect 100 and how barriers are dealt with in general. Interconnect 100 connects a plurality of masters 200, 220, 240 and 260 to a plurality of slaves 300, 320, 340 and 360 via a plurality of paths. These paths may have cross-coupled portions such as is shown for example at 400 where two paths each split into two at respective split points 410 and 420 and merge at merge points 440 and 450. There may also be bisection paths such as is shown for example at 500. These are paths that are the only connection between two nodes in the interconnect, such that cutting the path will in effect divide the interconnect in two.

When transactions pass along these different paths the nature of the paths, that is to say whether they are cross-coupled or bisection will affect the ordering of the transactions. A cross-coupled path for example will start with a split point that will divide the transaction stream into multiple transaction streams, and a transaction that was behind another transaction in the transaction stream before the split point may arrive at its destination before the transaction that it was previously behind arrives at its own destination. Transactions travelling along a bisection path must keep their order unless there is some functional unit that allows reordering such as a re-order buffer as is shown for example at 60. Re-order buffers are used for re-ordering transactions to allow transactions of a higher priority to be delivered to the slave before transactions of a lower priority.

There are also paths that are termed reconvergent wherein paths that are previously split come back together and this can also cause re-ordering within the transaction stream. Interconnect 100 does not have any reconvergent paths.

The fact that transactions can arrive at their destinations in a different order to the order that they were sent in can lead to problems where a subsequent transaction is dependent on a previous transaction and thus, needs it to complete first. For example, if there is a store instruction ahead of a load instruction to a same address in a transaction stream, then it is important that the store is performed before the load, or the load will read an incorrect value. In order to allow a programmer to ensure that the required transactions arrive in the required order, interconnect 100 is configured to respond to barrier transactions within the transaction stream to maintain ordering of transactions within the interconnect with respect to the barrier. Thus, a barrier transaction can be inserted between transactions which should not overtake each other and this will ensure that this does not occur.

The interconnect may respond to these barrier transactions by delaying the transactions that occur in the transaction stream subsequent to the barrier transaction from progressing through the interconnect until a response signal to the barrier transaction has been received. The response signal indicates that it is safe to send a subsequent instruction. It should be noted that a response signal that clears a path might be a signal indicating that the earlier transactions have all completed, or it may simply be a signal indicating that the barrier transaction has passed along a path, if for example the path is a bisection path, or that the barrier has reached a node where an early clearing response signal is sent and blocking is performed again.

The interconnect may also simply send the barrier transaction along the various paths behind the previous transactions so that when the barrier is detected as reaching a certain point the interconnect can be sure that all the previous transactions have already passed through this point. Whether it simply transmits the barrier within the stream, or delays the transactions depends on the nature of the barrier and whether it is a blocking barrier or not.

A blocking barrier is a barrier where the transactions behind it in the transaction stream that it controls have been blocked somewhere upstream, and thus, other transactions may overtake a blocking barrier as they are necessarily not those that need to stay behind it, however, the barrier itself cannot overtake any transaction requests in front of it that it controls. A blocking barrier can be unblocked by an early response unit. This is described in more detail below.

A non-blocking barrier is a barrier where no transaction requests have been blocked and thus, transaction requests that it controls must stay on the correct side of this barrier transaction request. As there is no upstream blocking, it cannot be unblocked by an early response unit. As will become clear later the different nature of the barriers may be indicated by blocking or non-blocking indicators, alternatively a system may only support one type of barriers in which case indicators are not required. Alternatively one barrier may be the default barrier type and in this case only the other type of barrier is provided with an indicator. Alternatively there may be regions of the interconnect where all barriers act as blocking barriers and regions where they all act as non-blocking. In such a case the interconnect may be configured such that barriers carry no indicators but the interconnect will treat them in a certain way dependent on their location within the interconnect.

The progress of the barrier transactions is controlled by control circuitry 70. This is schematically shown as a single block in this figure, however in reality the control circuitry is distributed throughout the interconnect adjacent to the circuitry that it controls. Thus, at each split point for example there will be some control circuitry that ensures at least in some embodiments that when a barrier transaction is received it is duplicated and a duplicate barrier transaction is sent down each exit path from the split point. There may be other embodiments where the duplicated barrier is sent down all but one exit paths, and this will be described later. The control circuitry will be aware that the barrier transaction has been duplicated and thus, may require response signals from each duplicated barrier transaction before it can clear the paths for transmission of the transactions that are subsequent to the original barrier transaction and must remain subsequent to it.

In its simplest form a barrier transaction is issued by a master, for example master 200 and the master 200 then blocks all subsequent transactions until it has a response signal from the interconnect indicating that it can transmit the subsequent transactions. Alternatively the barrier may be issued by the control circuitry immediately on entry to the interconnect. The transactions before the barrier transaction and the barrier transaction are transmitted to the interconnect and control circuitry 70 controls the routing of these transactions. Thus, at split point 420 the barrier transaction is duplicated and it travels to merge points 440 and 450. At this point the transactions are entering bisection paths 500 and 520 and as transactions cannot change their position with respect to a barrier on these paths when the barrier transaction arrives at the start of one of these paths one knows that all the transactions previous to it are ahead of it and will remain ahead of it along that path. Thus, an early response signal can be sent by clearing units 800 and in response to receiving both of these signals the control circuitry at split point 420 sends the early response signal to master 200 which can then unblock the transactions subsequent to the barrier transaction that are controlled by it and transmit them into the interconnect.

By providing an early response unit 800, master 200 is blocked for a much shorter time than had it awaited the response from the slaves indicating that the barrier transactions had reached the slaves and in this way the latency introduced by the barrier transactions is reduced.

The barrier transaction that passes along path 500 exits the interconnect and arrives at slave 300 without travelling along any path other than bisection path 500 and thus, there is no need to block again in response to this barrier transaction as once the barrier has passed clearing unit 800 the transactions in front of it must remain there. However, the barrier transaction that is sent along path 520 reaches a further cross-coupled section 480 and in response to receipt of the barrier transaction at the split point 490 control circuitry 70 associated with this split point duplicates the barrier transaction, sends it down both exit paths and blocks the entry path behind it to transaction requests that occur subsequent to the barrier and that are controlled by it. Thus, these subsequent transactions are stalled in some embodiments by being held in a buffer within the blocking circuitry 900 until a response signal is received to all duplicated barrier transactions. Thus, the duplicated barrier transactions pass through the cross-coupled circuitry 400 and exit the cross-coupled circuitry to join further bisection links 520 and 500. As noted before, a bisection path retains transactions in order relative to the barrier and thus, an early response can be sent from the start of the bisection path by clearing units 800. Blocking circuitry 900 waits to receive a response to the barrier transaction from split point 490. Spilt point 490 duplicates the barrier transaction and sends two barrier transactions further one down each path. Split point 490 does not send a response back to blocking circuitry 900 until it has received a response from each of the two barrier transactions that it has transmitted. In response to this response, blocking circuitry 900 allows any subsequent transactions held in its buffer to be transmitted. As the clearing circuitry is on the last bisection path before exit to the interconnect there is no need for further blocking for some barrier types.

There is as noted previously a re-order buffer 600 on bisection path 520 and this buffer is configured to be responsive to the barriers and does not allow transactions controlled by the barriers to be re-ordered with respect to the barriers.

In the previous description it is assumed that a barrier is there to maintain all the transactions that are subsequent to it behind it. However, in some embodiments, as will be seen in more detail later, the barrier may only need to stop a subset of the subsequent transactions from overtaking it, perhaps those from a particular master or those with a particular function, such as write transactions. In such a case, the control circuitry 70 and blocking circuitry 900 will only delay this subset of transactions and will allow the others to proceed. Furthermore, at a split point if the transactions that are controlled by the barrier will never go down one of the paths, a duplicated barrier does not need to be sent down that path.

Various modifications can be made to the example embodiments described.

We claim:

1. An initiator device for issuing transaction requests to a recipient device via an interconnect, said initiator device comprising:

at least one port for receiving requests from and issuing requests to said interconnect;

a barrier generator for generating barrier transaction requests, said barrier transaction requests indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to said barrier transaction request; wherein in response to receipt of a synchronise request querying progress of at least a subset of transaction requests, said initiator device is responsive to action any pending transaction requests within said at least a subset of transaction request and to generate a barrier transaction request at said barrier generator and to issue said barrier transaction request to said interconnect via said at least one port, and in response to receiving a response to said barrier transaction request to issue an acknowledge signal as a response to said synchronise request.

2. An interconnect according to claim 1, wherein said subset of transaction requests comprise all transaction requests issued by said initiator device to said at least one recipient device and said at least some transaction requests whose ordering is maintained by said barrier transaction request comprise said all transaction requests issued by said initiator device.

3. An initiator device according to claim 1, said initiator device further comprising:
   a memory management unit;
   said at least a subset of transaction requests include said memory management operation requests and said synchronise request being a memory management synchronise request querying when said memory management operation requests have completed and when previously issued transaction requests whose status would be affected by said memory management operation requests have reached a predetermined point within said interconnect;
   said initiator device being configured to issue said acknowledge signal in response to receipt of said response to said barrier transaction request and in response to said pending memory management operations being completed.

4. An initiator device according to claim 1,
   said initiator device further comprising:
   a processor for processing data;
   said processor is configured to issue transaction requests and said synchronise request to said interconnect;
   said barrier generator being configured to generate a synchronise barrier transaction request and to issue said barrier transaction request to said interconnect to follow behind transaction requests issued by said processor to said at least one recipient device prior to said synchronise request.

5. An initiator device according to claim 1, wherein said barrier generator is configured to issue a barrier with a domain indicator associated with it, said domain indicator indicating an area within said interconnect within which a response to said barrier transaction request cannot be issued.

6. An initiator device according to claim 1, wherein said synchronise request is a request querying whether at least some of said subset of transaction requests have reached a predetermined point within said interconnect, said synchronise request comprising an indicator indicating said predetermined point.

7. An initiator device according to claim 3, wherein said initiator device comprises a further port for receiving transaction requests from a processor, said initiator device transmitting at least some of said transaction requests to said interconnect.

8. An initiator device according to claim 3 wherein said memory management operations comprise management of virtual to physical address translations and said at least some transactions that said barrier transaction maintains an order of comprise transactions using virtual to physical address translations current before said memory management operations are performed.

9. An initiator device according to claim 4, wherein said initiator device is responsive to said issue of said synchronise barrier transaction request not to issue further transaction requests to said interconnect until a response to said synchronise barrier transaction request and to said synchronise request has been received.

10. An initiator device according to claim 6 wherein said barrier generator is configured to issue a barrier with a domain indicator associated with it, said domain indicator indicating an area within said interconnect within which a response to said barrier transaction request cannot be issued and said barrier generator is configured to issue said barrier domain indicator in dependence upon said indicator comprised within said synchronise request.

11. An initiator device for issuing transaction requests to a recipient device via an interconnect, said initiator device comprising:
   a processor for processing data;
   at least one port for receiving requests from and issuing requests to said interconnect;
   a barrier generator for generating barrier transaction requests, said barrier transaction requests indicating to said interconnect that an ordering of at least some transaction requests within a stream of transaction requests passing through said interconnect should be maintained by not allowing reordering of said at least some of said transaction requests that occur before said barrier transaction request in said stream of transaction requests with respect to said barrier transaction request; wherein
   said processor is configured to issue transaction requests and a synchronise request querying progress of at least a subset of outstanding transaction requests to said interconnect;
   said barrier generator being configured to generate a synchronise barrier transaction request and to issue said synchronise barrier transaction request to said interconnect to follow behind transaction requests issued by said processor prior to said synchronise request to the at least one recipient device.

12. An initiator device according to claim 11, wherein said at least a subset of transaction requests include said memory management operation requests and said synchronise request is a memory management synchronise request querying when said memory management operation requests have completed and when previously issued transaction requests whose status would be affected by said memory management operation requests have reached a predetermined point within said interconnect.

13. Interconnect circuitry for a data processing apparatus, said interconnect circuitry being configured to provide data routes via which at least one of a plurality of initiator devices may access at least one recipient device and at least one other of said plurality of initiator devices, said interconnect circuitry comprising:
   a plurality of initiator ports for transmitting transaction requests between said plurality of initiator devices and said interconnect;

at least one recipient port for transmitting transaction requests to said at least one recipient device;
a plurality of paths for transmitting said transaction requests between said plurality of initiator ports and said at least one recipient port; and
control circuitry for routing said received transaction requests from one of said plurality of inputs to one of said input or output ports along at least one of a plurality of paths; wherein
at least some of said transaction requests comprise a synchronise request from a first one of said plurality of initiator devices querying progress of at least a subset of transaction requests; and
said control circuitry is configured to route said synchronise request to at least one other of said initiator devices configured to action said at least a subset of transaction requests and to receive from said at least one other of said initiator devices a barrier transaction request said control circuitry being configured to route said barrier transaction request along at least one of said plurality of paths behind transaction requests previously received from said at least one other initiator device to said at least one recipient device and to maintain an ordering of at least some of said previously received transaction requests and said barrier transaction request in said transaction request stream;
and in response to a response signal to said barrier transaction request to route said response signal to said at least one other of said plurality of initiator devices, said response signal providing an indication to said at least one other initiator device that said at least some previously received transaction requests have reached a location of said response signal generator.

14. An interconnect according to claim 13, wherein said control circuitry comprises synchronise request duplication circuitry for duplicating said synchronise request and transmitting it to a plurality of said other initiator devices that action said at least a subset of said transaction requests;
said control circuitry further comprising holding circuitry for holding response signals received from said plurality of other initiator devices to said duplicated synchronise request and for issuing a synchronise request response signal to said first initiator device in response to receipt of acknowledge responses to all of said duplicated synchronise requests.

15. An interconnect according to claim 13, said interconnect being configured in response to receiving a barrier transaction request from said first initiator device to route said barrier transaction request to said at least one recipient device behind transaction requests previously received from said first initiator device and routed to said at least one recipient device, said control circuitry being configured to maintain an order of at least some of said previously received transaction requests with respect to said barrier transaction request and in response to a response signal to said barrier transaction request to route said response signal to said first initiator device, said response signal providing an indication to said first initiator device that said at least some of said previously received transaction requests have reached a location of said response signal generator.

16. An interconnect according to claim 13, wherein said at least a subset of transaction requests are memory management operation requests and said synchronise request is a memory management synchronise request querying when said memory management operation requests have completed and when previously issued transaction requests whose status would be affected by said memory management operation requests have reached a predetermined point within said interconnect.

17. An interconnect according to any claim 13, said interconnect comprising a response signal generator for generating said response signal in response to receipt of said barrier transaction request.

18. Interconnect circuitry according to claim 13, wherein at least some of said plurality of paths are divergent paths diverging from a node, said control circuitry being configured to duplicate and transmit said at least some transaction requests and said following barrier transaction request along at least some of said divergent paths that said at least some transaction requests are routed along.

19. An interconnect according to claim 16, wherein said memory management operations comprise management of virtual to physical address translations and said at least some transactions that said barrier transaction maintains an order of comprise transactions using virtual to physical address translations current before said memory management operations are performed.

20. Interconnect circuitry according to claim 17, said interconnect circuitry comprising at least one domain, said at least one domain comprising at least one of said at least one inputs for receiving transaction requests from said at least one initiator device, a domain boundary being arranged such that any merging of transaction requests received from said at least one input occurs within said at least one domain; and
said synchronise request comprising an indicator indicating which of said at least one domain it applies to; and
said response signal generator being located at an exit point of said at least one domain;
said response signal generator being responsive to detecting said barrier transaction request passing said exit point to generate a response signal;
said control circuitry being configured to transmit said response signal to said initiator device from which said barrier transaction request was received.

21. Interconnect circuitry according to claim 20, wherein said control circuitry is configured not to transmit said barrier transaction further having transmitted said response signal to said initiator device.

22. Interconnect circuitry according to claim 18, said control circuitry comprising holding circuitry at said node, said holding circuitry being configured to hold response signals received from said duplicated barrier transaction requests and only to transmit said received response signals to said source of said barrier transaction request in response to receiving a response to all of said duplicated barrier transaction requests.

23. A data processing apparatus comprising a plurality of initiator devices communicating with at least one recipient device via an interconnect, at least one of said initiator devices comprising an initiator device for issuing transaction requests to a recipient device via said interconnect, said initiator device comprising:
at least one port for receiving requests from and issuing requests to said interconnect circuitry;
a barrier generator for generating barrier transaction requests, said barrier transaction requests indicating to said interconnect circuitry that an ordering of at least some transaction requests within a stream of transaction requests passing through said interconnect circuitry should be maintained by not allowing reordering of at least some of said transaction requests that occur before said barrier transaction request in said stream of transaction requests with respect to said barrier transaction request; wherein in response to receipt of a synchronise request querying progress of at least a subset of transaction requests, said initiator device is responsive to action any pending transaction requests within said at least a subset of transaction request and to generate transaction request at said generator barrier generator and to issue said barrier transaction request to said interconnect circuitry via said at least one port, and in response to receiving a response to said barrier transaction request to issue an acknowledge signal as a response to said synchronise request, said initiator device further comprising:

a memory management unit;

said at least a subset of transaction requests include said memory management operation requests and said synchronise request being a memory management synchronise request querying when said memory management operation requests have completed and when previously issued transaction requests whose status would be affected by said memory management operation requests have reached a predetermined point within said interconnect;

said initiator device being configured to issue said acknowledge signal in response to receipt of said response to said barrier transaction request and in response to said pending memory management operations being completed, and said in circuitry being interconnect circuitry according to claim 13.

24. A method of synchronising a data processing apparatus comprising a plurality of initiator devices issuing transaction requests to at least one recipient device via an interconnect said method comprising the steps of:

issuing a synchronise request querying progress of at least a subset of transaction requests; and routing said synchronise request to said at least one other of said plurality of initiator devices that is configured to action said at least a subset of transaction requests;

issuing a barrier transaction request from said at least one other of said initiator devices;

routing said barrier transaction request along at least one of said plurality of paths behind transaction requests previously received from said at least one other initiator device to said at least one recipient device to maintain an ordering of at least some of said previously received transaction requests and said barrier transaction request in a transaction request stream; and in response to a response signal to said barrier transaction request routing said response signal to said at least one other of said plurality of initiator devices, said response signal providing an indication to said at least one other initiator device that said previously received transaction requests have reached a location of said response signal generator;

generating an acknowledge signal responding to said synchronise request and routing said acknowledge signal towards said first initiator device.

25. A method of determining when to respond to a received synchronise request comprising the steps of:

issuing transaction requests to a recipient device via an interconnect;

receiving a synchronise request querying progress of at least a subset of transaction requests from said interconnect;

actioning any pending transaction requests within said at least a subset of transaction requests;

generating a barrier transaction request and issuing said barrier transaction request to said interconnect;

in response to receiving a response to said barrier transaction request issuing an acknowledge signal as a response to said synchronise request.

\* \* \* \* \*